United States Patent [19]
Erickson

[11] Patent Number: 5,660,049
[45] Date of Patent: Aug. 26, 1997

[54] SORBER WITH MULTIPLE COCURRENT PRESSURE EQUALIZED UPFLOWS

[76] Inventor: Donald C. Erickson, 1704 S. Harbor La., Annapolis, Md. 21401

[21] Appl. No.: 556,502

[22] Filed: Nov. 13, 1995

[51] Int. Cl.$^6$ .............................. F25B 15/00; F25B 37/00
[52] U.S. Cl. .................. 62/107; 62/487; 62/494; 62/497
[58] Field of Search ................ 62/101, 107, 476, 62/484, 485, 487, 494, 497

[56] References Cited

U.S. PATENT DOCUMENTS

| | | | |
|---|---|---|---|
| 2,240,176 | 4/1941 | Coons et al. | 62/487 |
| 2,440,583 | 4/1948 | Hainsworth | 62/487 |
| 3,254,507 | 6/1966 | Whitlow | 62/497 |
| 3,828,576 | 8/1974 | Eidet | 62/490 |
| 4,127,993 | 12/1978 | Philips | 62/101 |

*Primary Examiner*—William Doerrler

[57] ABSTRACT

A sorber for sorbing a vapor into (absorber) or out of (desorber) a liquid sorbent comprised of a sequential plurality of highly effective and intensified locally cocurrent sorptions, but with non-cocurrent flow of vapor and liquid between the individual sorptions. The structure containing the locally cocurrent upflow is preferably comprised of enhanced heat transfer surface, making the sorption diabatic, further enhancing the intensification, and improving the sorption efficiency. Referring to FIG. 12, vertical cylinders (70) and (71) form an annular space within which desorption occurs, powered by external heat source (72) and internal heat recuperation (77). The liquid portion of the annulus is divided into multiple compartments by folded rectangular fin (73). The space above fin (73) allows pressure equalization of all compartments. Each compartment is divided by insert (80) into separate vapor-liquid riser channels and a liquid downcomer channel. The sorbent liquid flow sequentially through the compartments via flow ports (74). The same high effectiveness sequential liquid recirculating cocurrent upflow desorption can also be accomplished in a horizontal cylindrical annulus, in plate fin exchangers, and in other geometries.

24 Claims, 17 Drawing Sheets

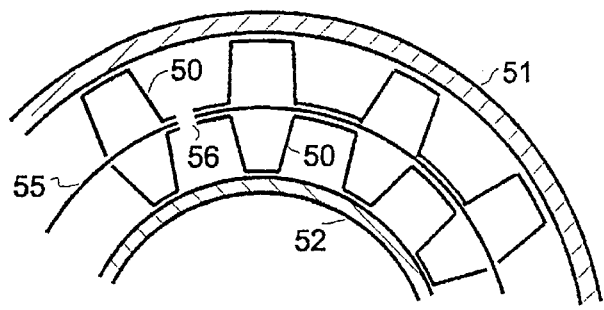
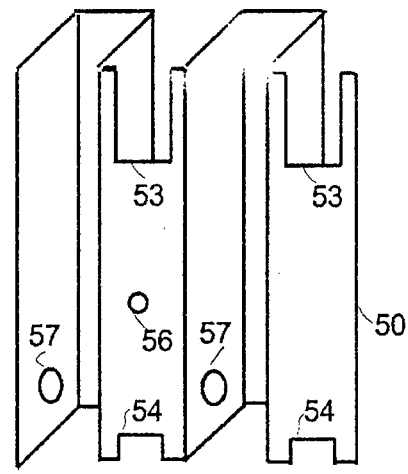
Fig. 8        Fig. 9
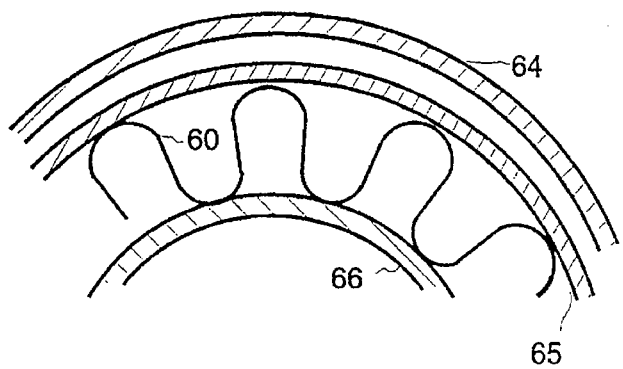
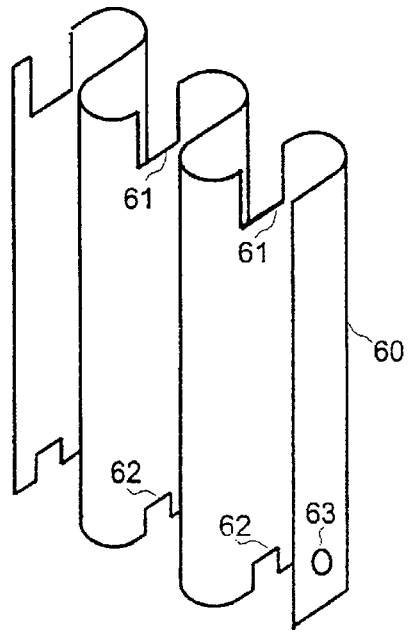
Fig. 10       Fig. 11

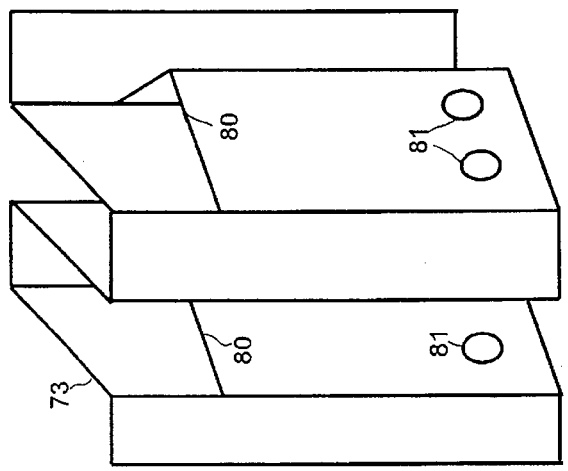
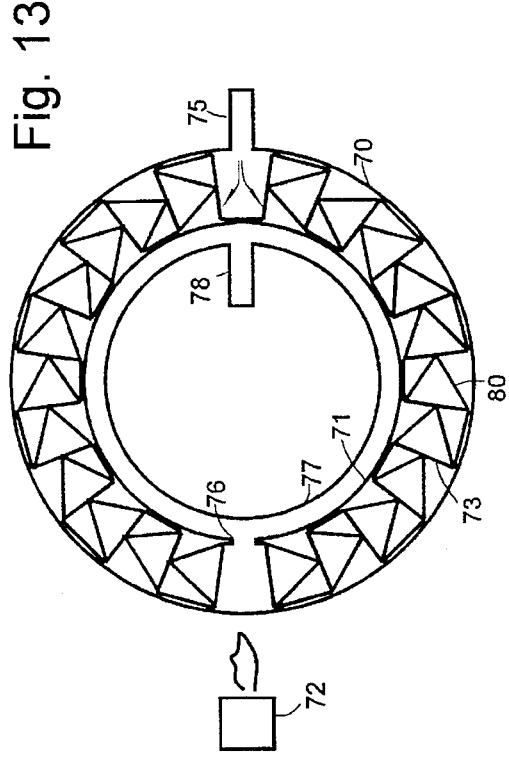
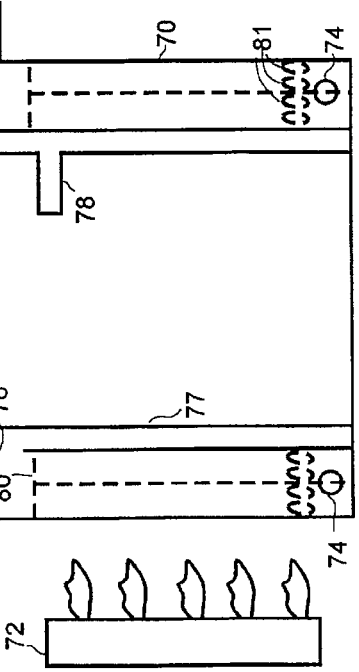

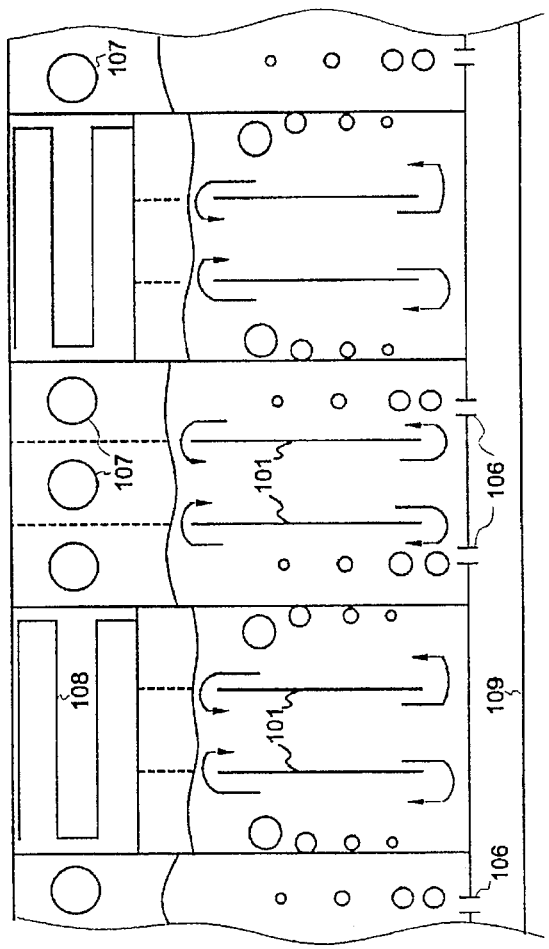 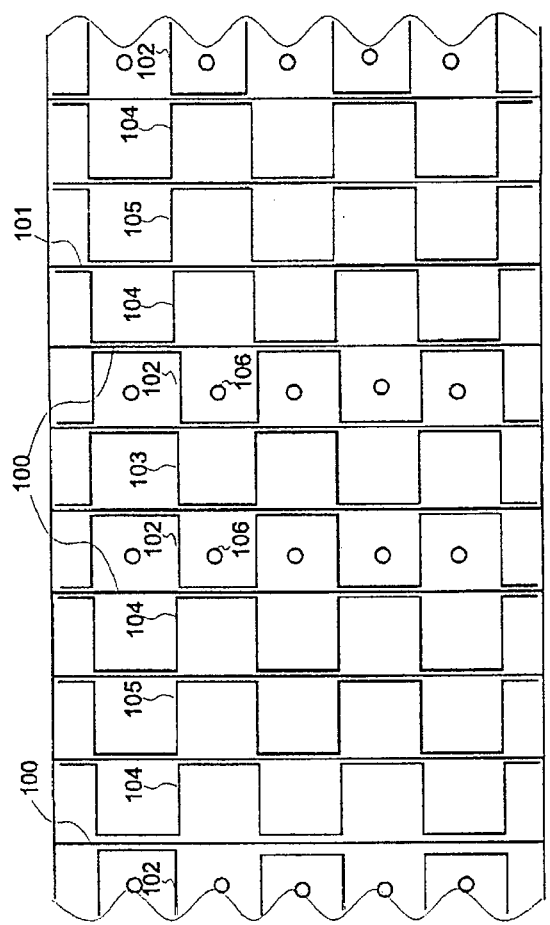
Fig. 25
Fig. 26

SORBER WITH MULTIPLE COCURRENT PRESSURE EQUALIZED UPFLOWS

TECHNICAL FIELD

Multi-component fluid mass exchanging processes such as absorption, desorption, and fractional distillation are encountered in many industrially important processes such as petroleum refining, chemicals production, $CO_2$ scrubbing and subsequent regeneration, and absorption heat pumping. Generically there are four distinguishable regimes of countercurrent multi-component fluid mass exchange operation:

1. more volatile component (vapor) withdrawn at top, heat extracted (also called rectification, dephlegmation, fractionating condensation, or reflux exchanger)
2. more volatile component (liquid) supplied at top, heat supplied (also called stripping, desorption, or fractionating evaporation)
3. less volatile component (liquid) supplied at top, heat extracted (also called absorption)
4. less volatile component (vapor) withdrawn at top, heat supplied.

The same regimes apply for crosscurrent mass exchange, except the "top" distinction no longer necessarily applies since the liquid is no longer necessarily falling and the vapor rising. The first two regimes taken together are commonly referred to as fractional distillation, and the last two as reverse distillation, also known as a "mixing column" (U.S. Pat. Nos. 4,818,262 and 2,667,764). The second and third are present in regenerative absorption processes such as $CO_2$ scrubbing.

For each operating regime the heat supplied or extracted can be at one end only (hot end for supplied heat, cold end for extracted), in which case the remainder of the mass exchange is termed adiabatic, or the heat exchange can be all along the component, in which case it is termed diabatic. Also, each operating regime can be further distinguished according to whether the vapor is single component (nonvolatile liquid absorbent) or multi-component (at least two volatile species in the liquid, i.e. volatile liquid absorbent).

BACKGROUND ART

Multi-component said mass exchange as presently practiced entails numerous problems and difficulties, as indicated below.

The exchange of mass between liquid and vapor can be conducted cocurrently, countercurrently, or crosscurrently, analogous to heat exchange processes. Countercurrent mass exchange can achieve complete separations and correspondingly maximum temperature glide (the change in equilibrium temperature associated with a change in concentration). Cocurrent mass exchange is severely limited both as to the degree of separation achievable and the temperature glide resulting from absorption. By increasing the number of crosscurrent stages, crosscurrent mass exchange can be made to nearly approach countercurrent performance.

The exothermic multi-component fluid mass exchanging processes, i.e. those in which there is a net transfer of mass from vapor to liquid phase, exhibit high resistance to mass transfer owing to a concentration gradient in the liquid film. When the vapor is also multi-component, a similar concentration gradient exists in the vapor phase, which in many cases is an even greater resistance to mass transfer. These effects are also present in the endothermic processes, e.g. desorption or stripping. When the endothermicity (i.e. the supplied heat) causes nucleate or bulk boiling at the heated surface, the difference in concentration between the vapor and liquid phase causes large concentration gradients locally. However this effect is offset by the mixing effect that the moving bubbles have on the liquid film.

Fully countercurrent processes such as conventional fractional distillation have the problem that most of the vapor must pass through most of the countercurrent stages, even though a very small fraction of vapor is actually exchanged within each stage (or transfer unit). Thus very large column diameters are necessary, with loadings constrained by flooding velocity or entrainment. The conventional countercurrent configuration uses gravity downflow of liquid, and hence the stages (or packing) are stacked vertically, frequently extending 30 meters or more in height. Diabatic distillation is much more energy efficient than adiabatic distillation, since the input heat can be on average colder and the reject heat on average warmer (less entropy generated). Presumably the reason diabatic fractional distillation is extremely rare are: the added resistance to mass exchange it entails, coupled with the need to disperse a heat exchanger over the extended height of typical columns, plus little change in first law efficiency. Thus the criterion of minimization of capital cost leads to quite energy inefficient distillation as currently practiced.

The benefits supplied by liquid recirculation to single component heated mass exchange processes, e.g. steam boiling, are widely known and practiced. The liquid recirculation causes higher liquid to vapor ratios in the boiling channels, enabling cocurrent upflow boiling while keeping the walls wetted at higher velocities, thereby causing thinner liquid films, more mixing, and more uniform temperatures. Liquid recirculation has also been applied to boiling a two component mixture (T. Fukuchi, "Development of Small-Sized Double Effect Gas Absorption Chiller/Heater," Proceedings 19th International Congress of Refrigeration Volume III b, p. 782–789, August 1995, and U.S. Pat. No. 4,127,993). In the U.S. Pat. No. 4,127,993 disclosure one downcomer serves one group of upflow channels, and a second one serves a second group. The two groups are not pressure equalized via a common vapor space. Additional examples of cocurrent upflow in the channels of an absorption cycle generator can be found in U.S. Pat. No. 5,435,154 and elsewhere. Cocurrent upflow is also known in absorption cycle absorbers, e.g. U.S. Pat. No. 5,339,654.

A multiple stage diabatic absorber with crosscurrent feed of vapor to each stage (called an "adiabatic regenerator") is disclosed in U.S. Pat. Nos. 4,921,515 and 5,157,942. Four absorption stages are illustrated, alternating between cocurrent upflow and countercurrent. The stages are not pressure equalized, hence the pressure increases each stage owing to forced serpentine circulation of liquid through the stages. Since the vapor is supplied crosscurrently, all of the vapor must be above the pressure of the highest pressure stage.

Absorption cycle processes and apparatus such as space conditioning systems, refrigeration systems, and heat pumps present a special case of multi-component fluid mass exchange requirements. A circulating liquid sorbent exothermically absorbs vapor and subsequently endothermically desorbs vapor. When the sorbent is volatile, rectification and/or stripping may also be called for. In many cases a large temperature glide is desirable with desorption—to extract more heat from a heat source, to reduce corrosive conditions, to reduce subsequent rectification requirements, and other reasons. Similarly it is frequently desired to achieve a large temperature glide in absorption—to create larger driving forces for heat rejection, to enable higher temperature recovery of useful heat, and other reasons, such as achieving temperature overlap between absorption and desorption. A cycle wherein heat is internally transferred within that overlap is termed a GAX cycle. That transfer of heat has proven to be a difficult problem for volatile sorbents with countercurrent heat and mass transfer, owing to the "gravity mismatch": the desorber with falling liquid sorbent is hottest at the bottom, whereas the absorber with falling liquid sorbent is hottest at the top. Countercurrent operation in the absorber (and hence falling liquid) is desirable because that yields the greatest temperature glide, thus resulting in greatest temperature overlap. Larger temperature overlap makes possible more internal transfer of heat, thus increasing cycle Coefficient of Performance (COP). Countercurrent operation in the desorber is desirable as it reduces or eliminates subsequent rectification needs.

The original approach to accomplishing the GAX heat exchange was to use an intermediary hermetic heat transfer loop. Although this retained the desirable countercurrent configuration of both sorptions, it imposed an additional heat transfer temperature differential, thus negating much of the objective of maximizing the temperature overlap. Also an additional fluid loop with precise and variable flow was required. Hence over the past decade the norm has shifted to a direct exchange of GAX heat between sorption cycle fluids.

One early disclosure changed both GAX sorptions to fully cocurrent—(U.S. Pat. No. 4,311,019), thus falling liquid and the attendant vertical configuration was no longer required. Cocurrency yields good transfer coefficients, but severely limits the temperature glide of absorption, and hence reduces the temperature overlap and COP. More typical has been to conduct only the GAX desorption cocurrently, while retaining countercurrent (falling liquid) GAX absorption. This preserves the full GAX temperature overlap, but requires much greater rectification following the GAX desorption. Most cycle disclosures of the past decade have been this type, including U.S. Pat. Nos. 4,846,240 and 5,367,884. Unfortunately this approach retains the difficult mass transfer associated with countercurrent absorption when used with a volatile sorbent. Conversely, combining cocurrent absorption with countercurrent desorption yields significant hardware advantages but imposes a major thermodynamic disadvantage (owing to the concentration mixing).

Thus it would be highly advantageous, and included among the objects of this invention, to achieve both absorption and desorption in an absorption cycle apparatus in such a manner that the thermodynamic benefit of countercurrent operation is nearly achieved without the normally accompanying mass transfer difficulties. It is further desired this be accomplished with simple, low-cost enhanced heat and mass transfer apparatus. It is most desired that countercurrent heat exchange be directly possible in a GAX component comprised of such an absorber and desorber. Examples of low-cost enhanced transfer surface are brazed plate fin; stamped fins pressed on cylinders, and plate fin fitted within an annular space between pressure vessels.

Absorption cycles generally and particularly GAX cycles have very low liquid flow rates relative to the vapor flow rate, and as a result require exceptionally good liquid distributors. Furthermore, the achievement of the desired temperature glide in a vertical direction (countercurrent operation) requires more height than is normally allowable for small scale space conditioning apparatus. Another common problem in absorption cycle absorbers is excessive subcooling of the liquid sorbent. Desirably all three of these problems are also solved by the invention.

It would be desirable, and included among the objects of this invention, to achieve the high exchange efficiency benefit of cocurrent upflow sorption without at the same time suffering the various disadvantages of prior art disclosed approaches:

the thermodynamic penalty and reduced temperature glide associated with globally cocurrent absorption the increased rectification requirement associated with globally cocurrent desorption the lack of adequate liquid flow relative to vapor, thus restricting the amount of cocurrent vapor-liquid upflow possible excessive and/or cumulative pressure drops high vertical height requirements need for multiple separators which add to overall height requirements heat exchange with cocurrently flowing combustion gas.

excessive subcooling of sorbent exiting the absorber.

Also included among the objects of this invention are achievement of a near approach to the thermodynamic benefit and large temperature glide obtainable with countercurrent vapor-liquid contact, without the attendant prior art disadvantages of:

need for liquid feed distributor which is highly effective need for liquid redistributors, or suffer liquid maldistribution.

limited by flooding or entrainment velocity, causing very large cross-sectional contact areas and very high vertical height difficulty in maintaining good vapor velocity and turbulence all along the sorption, owing to large changes in vapor flow rate, especially disadvantageous with volatile sorbents pressure drop directly proportional to the number of sorption stages.

The energy benefits of conducting fractional distillation stripping and rectification diabatically, plus also particular hardware configurations which make it possible to do so, have been disclosed in U.S. Pat. Nos. 4,025,398, 3,756,035, and 3,508,412.

The advantages of locally cocurrent, globally countercurrent distillation, plus also one particular enabling hardware configuration, are disclosed in U.S. Pat. No. 4,361,469. In particular, that invention achieves intensification and compactness with regard to column diameter, owing to avoiding the flooding limitation in part of the apparatus. However there is no reduction in the required number of vertical trays, and the tray height may even be higher owing to the need for a vapor-liquid separator above each tray. Furthermore the tray pressure drops are cumulative, i.e. the trays are not pressure equalized via a common vapor space, and also most of the vapor must traverse most of the trays. Thus it would also be advantageous and an object of this invention to accomplish fractional distillation, stripping, rectification, and/or reverse distillation diabatically in more compact, lower height and lower cost apparatus.

DISCLOSURE OF INVENTION

The above and other useful objects are attained by process and apparatus comprised of a series of at least three cocurrent upflow vapor liquid contacts (sorptions) which are 1) pressure equalized, 2) individually liquid recirculated by gravity, and/or 3) globally crosscurrent (at least two and preferably all three features are incorporated). In the preferred embodiments the sorptions are diabatic, i.e. each contact zone is in heat exchange relationship with a heat transfer medium. When heat is supplied, vapor is preferably withdrawn from the several desorptions countercurrently to the sequence in which sorbent is supplied to them. When heat is removed, vapor is preferably fed crosscurrently to the several absorptions, preferably to the bottom of each cocurrent upflow region. There are preferably at least ten cocurrent upflow regions, and they may number in the thousands. They are preferably horizontally arrayed and the sorbent is routed sequentially through the array in one or more parallel paths whereby the sorbent concentration changes in each member of the sequence.

In particular, adiabatic liquid sorber is disclosed comprised of a plurality of pressure equalized compartments, each compartment adapted for upflow of vapor and liquid in a portion thereof; a sequential flowpath for liquid through said compartments; and a means for exchanging heat with said compartments.

In yet a further particularity, a vapor-liquid contact apparatus is disclosed comprised of: a plurality of horizontally arrayed compartments; a common vapor space connecting said compartments; a baffle within each compartment which forms separate vapor-liquid cocurrent upflow channel and liquid downflow channel; a means for sequential flow of liquid through said compartments; and a vapor-liquid separation zone above each baffle Additional advantage is obtained with further variants of the above disclosures. The locally cocurrent sorptions may be arranged in groups or tiers, where the vapor exiting the sorptions of one tier is then crosscurrently supplied to the sorptions of the next tier. Note that when the sorption is a desorption, the use of tiering requires that the locally cocurrent compartments of the downstream (for the vapor) desorption tier have vapor injection ports. The advantage of tiering is that the sorption process thereby more closely approaches countercurrent conditions. The disadvantage is that the vapor pressure drop accumulates from tier to tier. For absorptions, the same effect of causing the sorption to more closely approach countercurrency can be obtained by preconditioning part of the vapor by contacting it with a small amount of sorbent before it is injected—preferably the hot, low volatility sorbent. For desorptions, it is correspondingly done via post-treatment, i.e. rectification with the colder, lower volatility sorbent.

The locally cocurrent horizontally arrayed compartments may take a variety of forms: 1) brazed (or welded) plate fin exchangers, wherein the flat plate members constitute the pressure boundaries between the sorption and the heating medium, and the fin members form the compartment boundaries (taller segments) and fins or inserts form the channel boundaries (shorter segments); 2) horizontal cylindrical annulus, wherein the compartment boundaries are thermally coupled flat disc fins, and curved shrouds form the channel boundaries; 3) vertical cylindrical annulus such as shapes, sheet fin, inserts, etc., with thermally coupled vertical wall members in the annulus forming the compartment boundaries and the channel boundaries; 4) vertical fin tube members with gaseous heat exchange outside and an internal partition or concentric tube forming the channel boundaries; and 5) other comparable geometries.

The locally cocurrent upflow provides intensified heat and mass transfer and eliminates the need for a liquid distributor. The intensification is particularly high in the slug flow and churn flow regimes, and not so high in bubbly flow. However the bubbly flow region (top portion of absorption channels) can be further enhanced by flow splitters, e.g. lanced offset fin, which acts to break up and reduce the size of the bubbles, thus increasing their surface area.

Relatively high liquid-to-vapor ratios (L/V) are required in the upflow channels to achieve slug flow—much higher than the typical overall L/V. Thus the liquid recirculation via downcomers allows that ratio to increase to the desired value. Conversely, dividing the vapor into multiple parallel paths also increases the L/V in each channel. The more compartments there are, the less liquid recirculation within the same compartment is required, and proportionately more of the liquid is recirculated or re-elevated to the next compartment. In the limiting case, all the downcomer liquid is recirculated elevated) to the next compartment.

The pressure equalization ensures that the total pressure drop is approximately equal to the pressure drop of a single compartment vice the accumulated pressure drops of all compartments. Typical vertical dimensions of the vapor-liquid contact upflow channels range from 10 cm to 200 cm. Consider an array of 50 compartments, each 30 cm high. With pressure equalization, the pressure drop is approximately 30 cm of hydrostatic head, whereas without it the $\Delta p$ would be 1500 cm hydrostatic head—a clearly undesirable amount.

The flow of liquid sorbent through the compartments is by gravity. For typical overall liquid flowrates, the liquid height change necessary for gravity flow from compartment to compartment is on the order of 1 mm or less. Thus it becomes possible to array the compartments horizontally. This eliminates the vertical height penalty associated with most vapor liquid contact devices, and also simplifies the construction of the enhanced transfer geometries such as those described above.

One major advantage of the horizontally arrayed configurations is that they provide a means to overcome the "gravity mismatch." Direct countercurrent heat exchange becomes possible between a globally noncocurrent mass exchange absorber and a globally non-cocurrent mass exchange desorber, by mounting them side-by-side in thermal contact. Previously at least one had to be globally cocurrent mass exchange in order to achieve the desired countercurrent heat exchange.

The sequential path of the liquid sorbent through the compartments, coupled with the parallel vapor injection, achieves a reasonable approach to countercurrent performance, with more crosscurrent stages causing closer approaches. Even closer approaches to countercurrency can be achieved via withdrawing vapor from the compartments countercurrently to the direction in which liquid is supplied; by tiering of the compartments and feeding the vapor sequentially to each tier (also called "multipassing"); and by pretreating absorption vapor or post treating desorption vapor.

The tradeoffs between the horizontal annular configuration and the vertical annular configuration include the following. With the horizontal configuration, the cylinder diameter approximately fixes the vertical height of the riser channel, and the cylinder length fixes the number of compartments. Conversely with the vertical configuration the cylinder diameter constrains the number of compartments, and the cylinder length (height) limits the height of the riser channels. Thus when the cylinder diameter is constrained by a consideration such as pressure vessel code, and doesn't result in channels of the desired length, then the vertical configuration would be preferred. The disc fins would typically be stamped from flat stock and then pressed or heat shrunk in place. The vertical fin material is readily available, easily assembled, and can be brazed or pressed in place. The vertical configuration suffers more heat leakage due to the insulated idle compartment which separates the coldest compartment from the hottest. However it is noted that that loss can be avoided by having two parallel paths for the liquid, proceeding in opposite directions around the circumference, whereby the hottest compartments are located 180° apart from the coldest ones. This is particularly valuable for a fired generator externally heated from a linear burner, whereby the hot combustion gas can impinge against the hottest side of the generator, and exit to the coldest, thus extracting more heat.

BRIEF DESCRIPTION OF THE DRAWINGS

FIGS. 1 through 20 present details of the vertical annular cylindrical configuration of the invention, both as an absorber and as a desorber, plus also as a combined (GAX) apparatus (FIGS. 15 and 20).

In particular, FIG. 1 is a cross-sectional side view of the vertical cylindrical configuration. FIG. 2 is a top cross-sectional view of the same configuration, and FIG. 3 shows the inserts which form the compartment and channel boundaries. FIG. 4 is a perspective view of the vertical cylindrical configuration of the locally cocurrent sorber. FIG. 5 is a cross-sectional side view of an embodiment having different compartment geometry and different vapor injection location than FIG. 1, and FIG. 6 is the corresponding top view cross-section. FIG. 7 is a perspective view of yet another vertical cylindrical configuration.

FIG. 8 is a detail of a top cross-sectional view of one section of an annulus containing fins, and FIG. 9 is a perspective view of the corresponding fins. FIG. 10 similarly shows an annular cross-section containing a different fin design and FIG. 11 is the perspective view of that fin.

FIG. 13 is a cross-sectional top view of a vertical cylindrical fired generator with locally cocurrent desorption, and split sequential flow of the sorbent from one side to the other. FIG. 12 is the corresponding side cross-sectional view, and FIG. 14 is a perspective view of the compartment fins.

FIG. 15 is a sectional top view of three concentric annuli, where the fin in the outer annulus has transfer enhancing inserts. FIG. 16 is a perspective view of the fin plus inserts.

FIG. 17 is a sectional side view of a tiered vertical cylindrical absorber configuration. FIG. 18 is similarly a tiered desorber configuration. FIG. 19 illustrates liquid pipes appropriate for a vertically tiered configuration.

FIG. 20 is a perspective view of a GAX absorption cycle wherein the generator, absorber, and GAX are each vertically oriented cylinders with annular locally cocurrent compartments.

FIGS. 21 through 28 present embodiments of the disclosed invention which are realized in plate fin exchanger apparatus.

FIG. 21 is a perspective view of a plate fin locally cocurrent upflow latent-to-latent heat exchanger. FIG. 22 is the corresponding top cross-sectional view, and FIG. 23 is a perspective view of the compartment inserts for this configuration.

FIG. 25 is a side cross-section view of a plate fin component, and FIG. 26 is the corresponding top cross-sectional view. FIG. 27 is a side cross-sectional view of a tiered plate fin locally cocurrent sorber, and FIG. 28 is the corresponding end view.

FIG. 29 is a front cross-sectional view of a horizontal cylindrical diabatic absorber containing pressure equalized locally cocurrent upflow compartments. FIG. 30 is the corresponding Side (end) view. FIG. 31 illustrates typical fin geometries in the horizontal cylindrical embodiment. FIG. 32 is a front cross-sectional view of a fire tube generator of the horizontal cylindrical design, and FIG. 33 is the corresponding side view. FIG. 34 is a perspective view of a GAX configured from horizontal cylinders with locally cocurrent compartments in the annuli. FIG. 35 is the corresponding front cross-sectional view, FIG. 36 the top view, and FIG. 37 the end view.

BEST MODE FOR CARRYING OUT THE INVENTION

Figure 1:
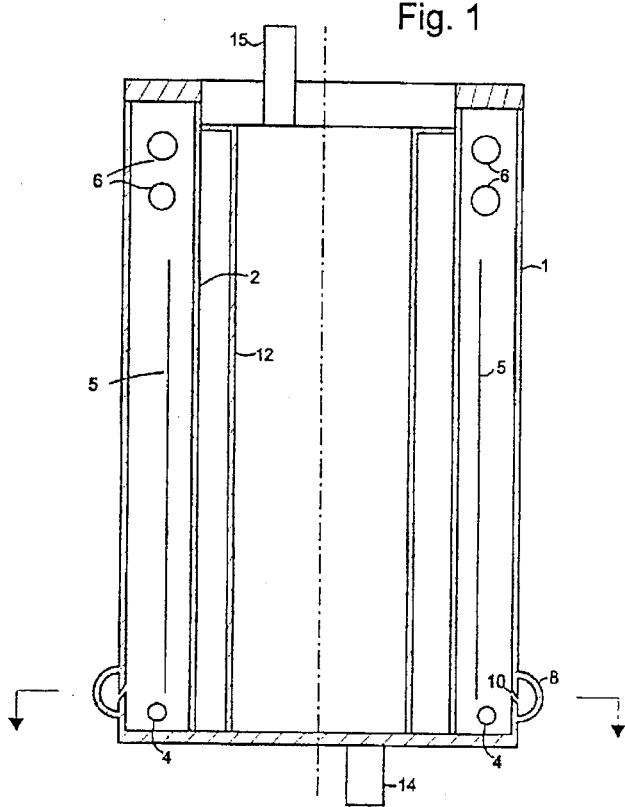
Figure 3:
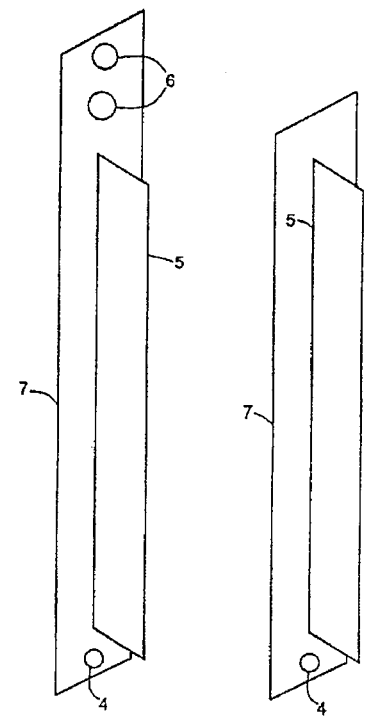
Figure 2:
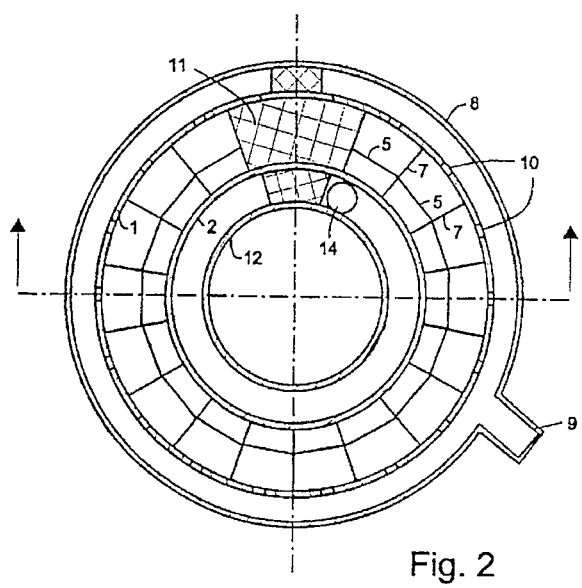

Referring to FIG. 1, a locally cocurrent upflow diabatic absorber is depicted in an elevation cross-sectional view, with FIG. 2 the corresponding cross-section viewed from above (plan view). Outer vertical cylinder 1 and inner cylinder 2 jointly form an annular space which is divided into compartments by partitions. The partitions may have a tee-shaped cross-section as depicted in FIG. 3, with cross-member 7, perpendicular member 5, and passages 4 for liquid transport. The tee-shapes may have vapor holes 6 for pressure equalization or alternatively may just be reduced in height to permit maximum vapor flow space. Vapor manifold 8 is supplied from vapor supply port 9. A vapor injection port 10 supplies vapor from manifold 8 into the bottom portion of each compartment. Vapor and liquid flow cocurrently upward outside of perpendicular member 5 in a riser channel. The quantity of vapor in the channel decreases with height as absorption proceeds. Once above member 5, any remaining vapor separates from the liquid and joins the vapor exiting all other compartment risers via ports 6. The liquid returns by gravity to the bottom portion of the compartment through a downcomer channel, i.e. the portion of the compartment which is inside member 5. Member 5 is shorter than cross member 7 both at the top and bottom, thus allowing liquid flow respectively into and out of the downcomer channel.

The arrangement illustrated in FIGS. 1 and 2 can readily be adapted to sequential flow of liquid through all the compartments by incorporating insulating block or segment 11 in the sorption annulus, and then supplying sorbent liquid to the compartment on one side of block 11, and removing absorbed liquid from the compartment on the other side of block 11. Segment 11 blocks the flow of sorbent through that section of annulus, and also provides insulation between the two different temperatures present on each side of it. Thus the sorbent liquid must traverse the long way around the annulus, sequentially through each compartment via the restricted liquid flow openings 4, and while in each compartment the traversing liquid will join in with the liquid recirculating in the riser and downcomer, and become well mixed with it. Vapor injection through port 10 is globally crosscurrent to this flow of liquid, while being locally cocurrent within each compartment.

Cooling is supplied to the diabatic absorber via concentric cooling compartment 12. The cooling may be supplied equally to all compartments. However if a larger temperature change is desired in the cooling fluid, a blocking segment 13 may be incorporated and the cooling water supplied initially to the coldest compartment wall via supply port 14, and withdrawn from the warmest compartment wall via withdrawal port 15.

The tee members which form the compartment and channel partitions may be affixed in place via any desired means, e.g. welding, brazing, heat shrink, press fit, etc. Preferably they will have good thermal contact with the cooled wall and hence will enhance the overall heat transfer. The vapor injection rate into each channel will preferably be large enough to cause slug flow in at least pad of the channel, whereby very high transfer coefficients are obtained.

Figure 4:
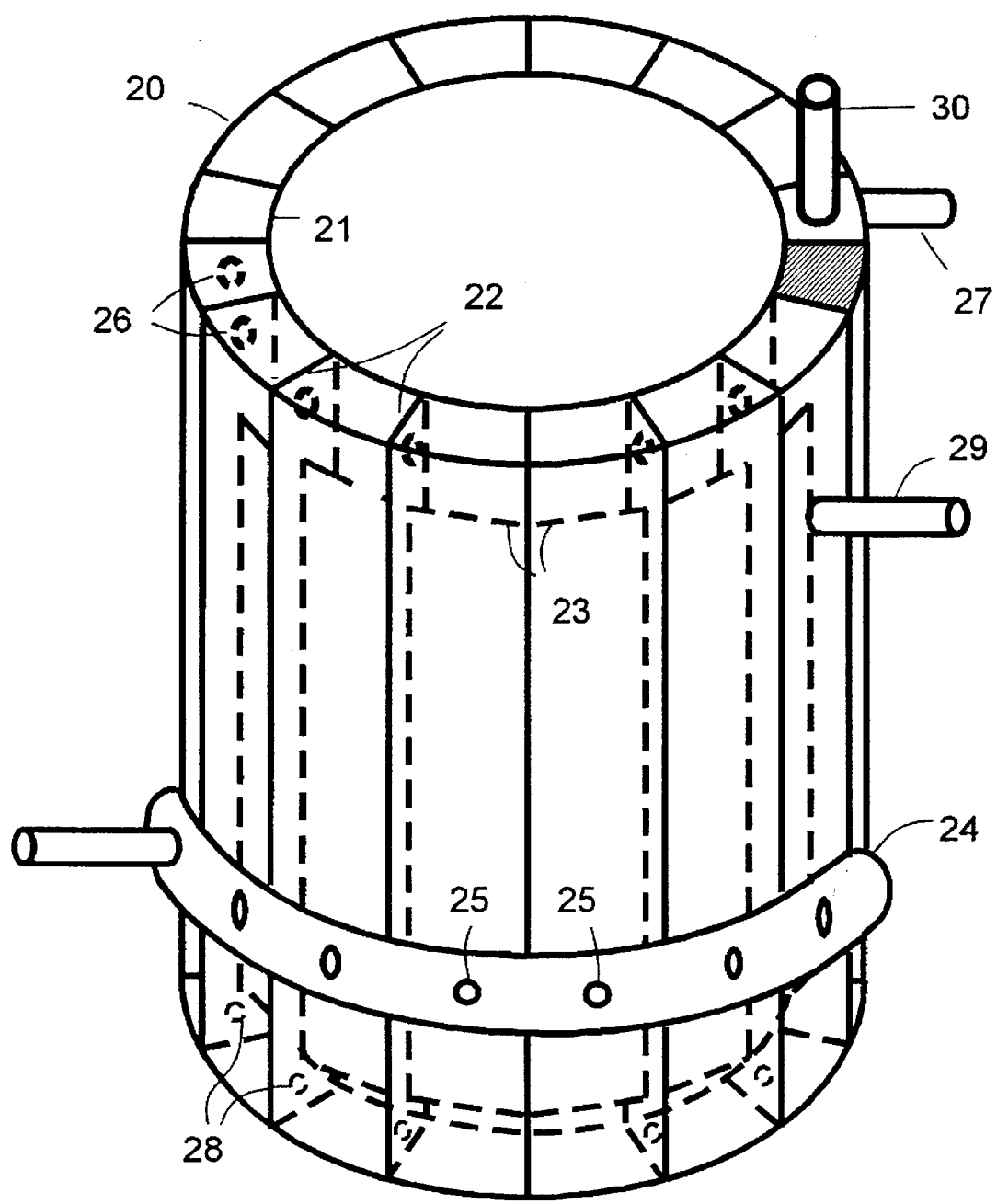

FIG. 4 is a perspective view of a sorber similar to that depicted in FIGS. 1 and 2. Absorbing occurs in the annular space between outer cylinder 20 and inner cylinder 21. The annular space is divided into compartments by partitions 22, and each compartment is divided into an inner and outer channel by baffles 23. Vapor supply manifold 24 supplies vapor crosscurrently into each channel via vapor injection pods 25. All compartments are pressure equalized via connecting their vapor spaces via vapor openings 26. Sorbent liquid is supplied at pod 27, traverses all compartments via liquid openings 28, and exits from pod 29. Pod 29 can be located at a height appropriate to maintain the desired liquid level in all compartments. FIG. 4 is depicted as an adiabatic sorber, i.e. with no heat exchange fluid in heat exchange relationship. However clearly a heat exchange fluid could be added in contact with the inner wall, as shown in FIGS. 1 and 2, and/or in contact with the outer wall as will be subsequently shown. If the heat exchange fluid is a heating fluid, the FIG. 4 apparatus is thereby a desorber, and vapor exit pod 30 is used to withdraw described vapor countercurrently to the flow direction of the sorbent. Conversely, when the heat exchange fluid is a cooling fluid, the apparatus is an absorber (provided less volatile liquid is supplied at pod 27).

Figure 5:
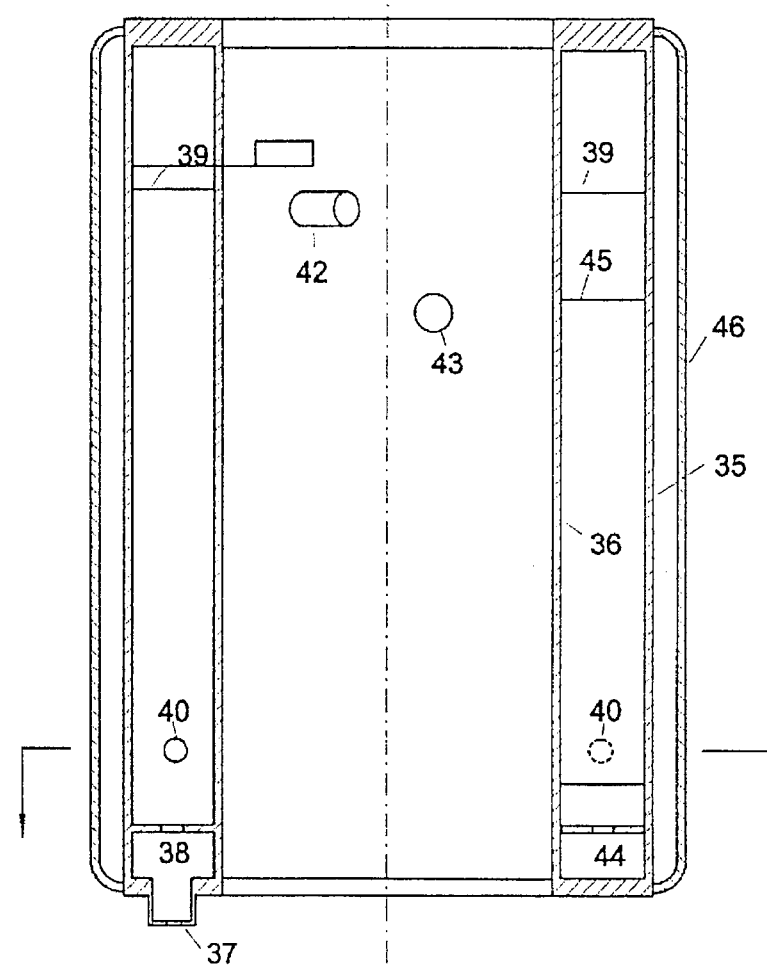
Figure 6:
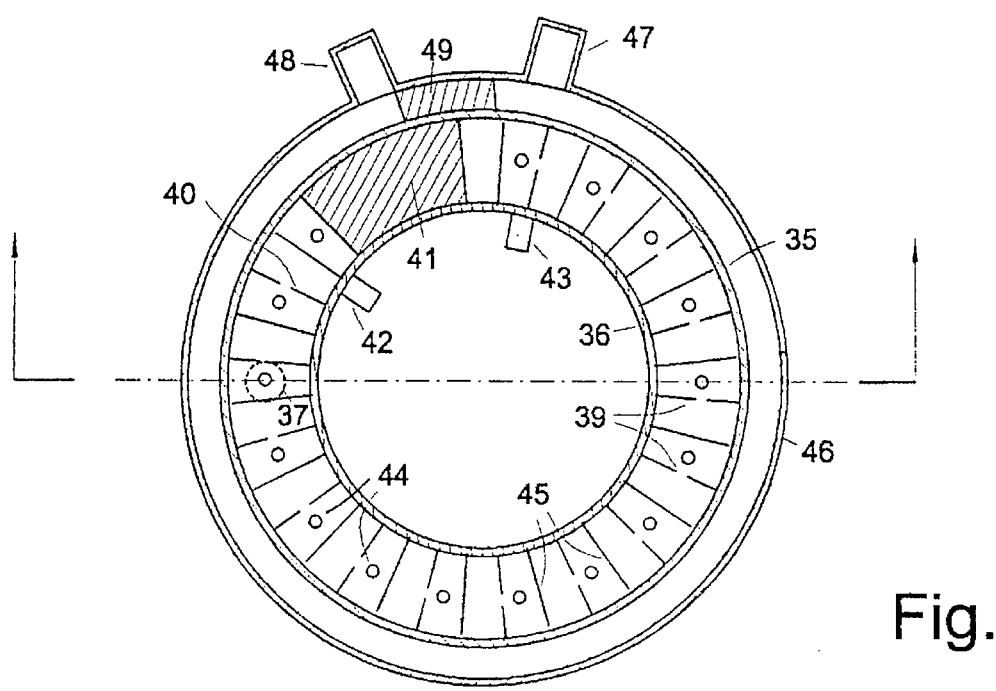

FIGS. 5 and 6 are respectively elevation and plan view cross-sections of another embodiment of adiabatic absorber. Outer and inner cylinders 35 and 36 define the annular space wherein sorption occurs; vapor supply pod 37 supplies vapor manifold 38 which is located in the same annulus; partitions 39 divide the annulus into individual compartments which are all interconnected at the top by a common vapor space, and which include passages 40 for restricted flow sorbent liquid sequentially through the compartments. Sorbent liquid is supplied through port 42 and removed via pod 43, where the two pods are separated by blocking segment 41. Vapor injection pods 44 supply the vapor into the bottom of a riser channel in each compartment, where the riser channel is separated from an accompanying downcomer channel by baffles 45. The baffle is shortened at top to allow vapor liquid separation within the compartment and at bottom so as to recirculate liquid to the riser channel. The cooling is provided via jacket 46, with supply and return ports 47 and 48. Blocking segment 49 allows the coolant to flow countercurrently, thus achieving maximum temperature increase.

Figure 7:
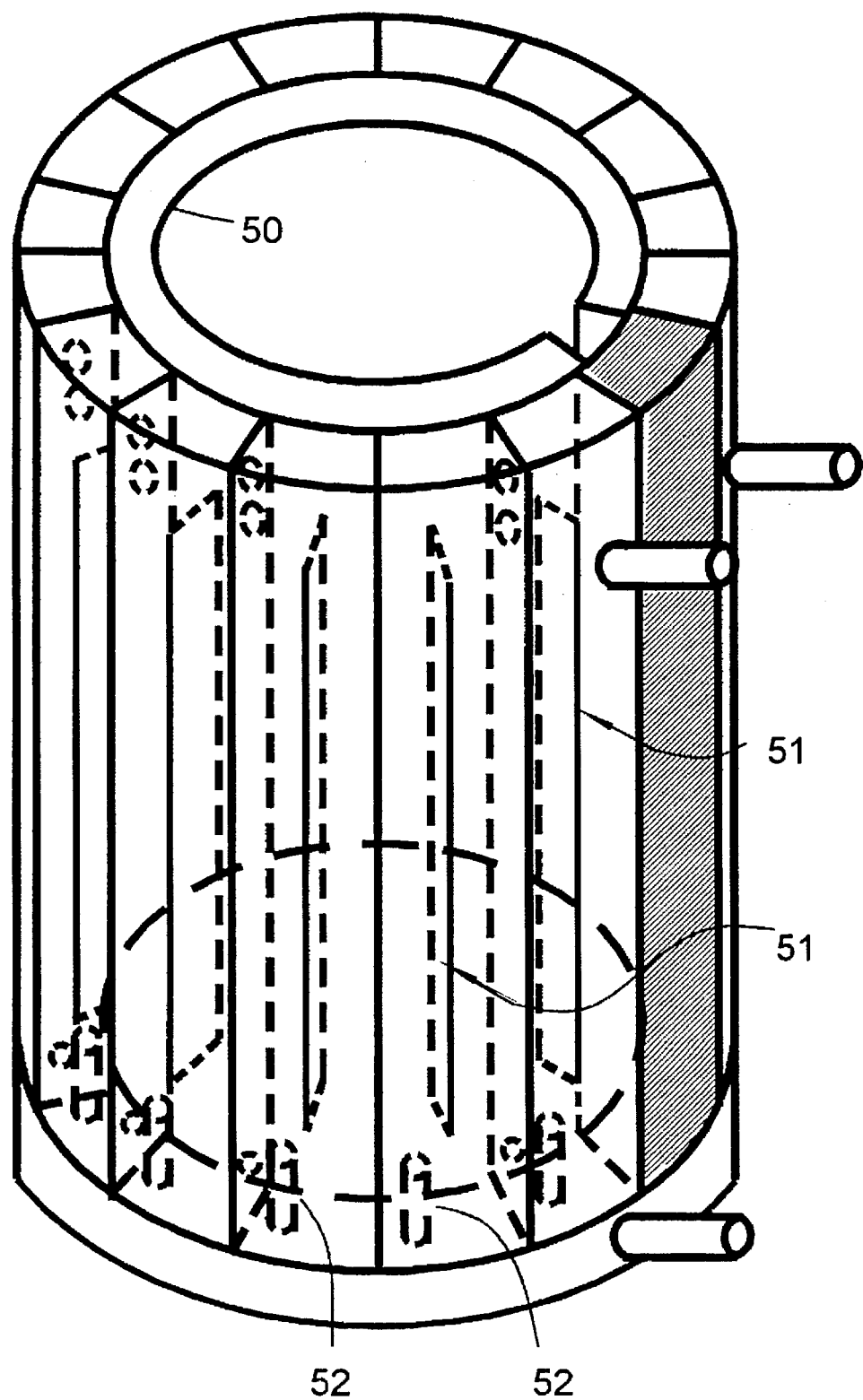

FIG. 7 is a perspective view of a similarly configured absorber, except for ease of illustration the cooling jacket 50 has been moved to the inside vice outside as in FIG. 6. Similar to FIG. 6, FIG. 7 shows the baffles 51 which separate the riser and downcomer channels as being radially oriented rather than circumferentially oriented. Thus the riser and downcomer channels are circumferentially displaced vice radially displaced as in FIGS. 1 and 2. This is possible for absorbers, since cooling the downcomer walls is helpful as well as cooling the riser walls. However it is not a preferred configuration for desorbers, since the heated walls are what give rise to the vapor which activates the riser channel. FIG. 7 also illustrates that the vapor injecting ports 52 may be actual standpipes or tubes, i.e. more elaborate than the simple holes illustrated previously.

A comparison of the similarities of the above figures will make evident the generic requirements for the locally cocurrent upflow, globally non-current sorber. There would be a plurality of pressure equalized compartments, with a sequential flowpath of liquid sorbent through them. Each compartment has separate vapor-liquid contact riser channel (s) and liquid downcomer channel(s) in the lower portion, and above that a vapor-liquid separation zone, and above that the vapor pressure equalization zone. The precise mechanics of how those features are accomplished admit to a wide variety of embodiments. FIGS. 8 through 16 illustrate some of the other approaches to those same generic features.

FIG. 8 is a segment of a cross-sectional plan view of an adiabatic sorber which shows another approach to achieving locally cocurrent vapor-liquid upflow contact in compartments in a vertical annular configuration. Rectangular plate fin material 50 as illustrated in FIG. 9 is inserted in the annular space between outer cylinder 51 and inner cylinder 52. The facing surfaces of the rectangular fin have cutouts 53 at the top and 54 at the bottom, thereby defining the channel baffle. Partition 55, affixed to the rectangular fin by a fastener through hole 56, e.g. a vivet, defines the channel baffle for an adjacent compartment. Holes 57 in the rectangular fin 50 allow sorbent passage.

FIGS. 10 and 11 illustrate how a single piece of fin 60 (in this case with rounded crown vice rectangular) can also be used to create locally cocurrent upflow compartments. Every other leg of the fin material has top cutouts 61 and bottom cutouts 62, thereby forming the channel baffle. The opposing legs have holes 63 for restricted passage of sorbent liquid. Cooling jacket 64 supplies cooling to the absorption. Thus the risers and downcomers are spaced circumferentially around the annulus between cylinders 65 and 66.

FIGS. 12 and 13 are respectively front and top cutaway views of a locally cocurrent upflow globally countercurrent diabatic desorber. Vertical outer cylinder 70 and inner cylinder 71 delimit the annular space within which desorption occurs. Flameholder 72 supplies heating fluid (combustion gas) to the outer wall of cylinder 70. Rectangular fin 73 (also shown in FIG. 14) is fitted into the annular space to form a plurality of compartments. Liquid sorbent transport holes 74 are in the bottom portion of each parallel fin member. From sorbent supply port 75 the sorbent liquid traverses both directions around the annulus to annulus exit port 76, becoming hotter and more concentrated as it does so. The hot "strong" sorbent (now strong in absorbing power) then enters a heating jacket 77, and flows countercurrently back to sorbent exit port 78. This heat exchange is commonly referred to as "generator heat exchange (GHX)". Thus heat is supplied to the desorption process occurring in the annular space through both the inner and outer walls. Desorbed vapor is withdrawn countercurrently to the flowpath of desorbing liquid, through port 79. With both walls being heated, it is desired to have the downcomer channel in the interior portion of each compartment, away from the walls. One effective way to do that is to use bent sheet metal inserts 80 which are inserted into each compartment, and which have liquid communication holes 81 in the bottom portion.

One key feature of the FIG. 12 and 13 embodiment is the parallel sequential flow of sorbent both ways around the annulus, thereby avoiding the need for the blocking segments illustrated earlier. It will be recognized that this parallel sequential flow could be applied to the other cylindrical configurations as well.

Figure 15:
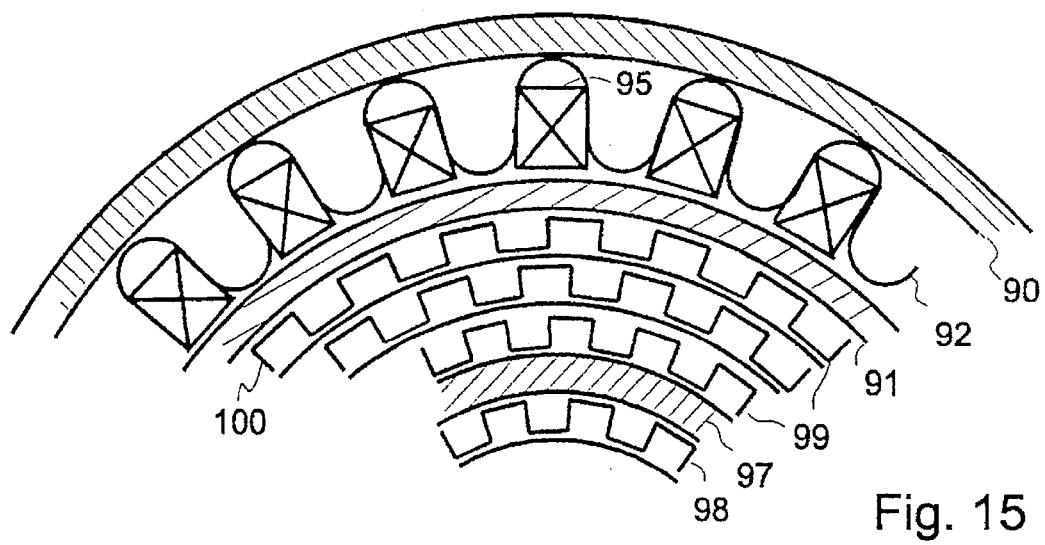
Figure 16:
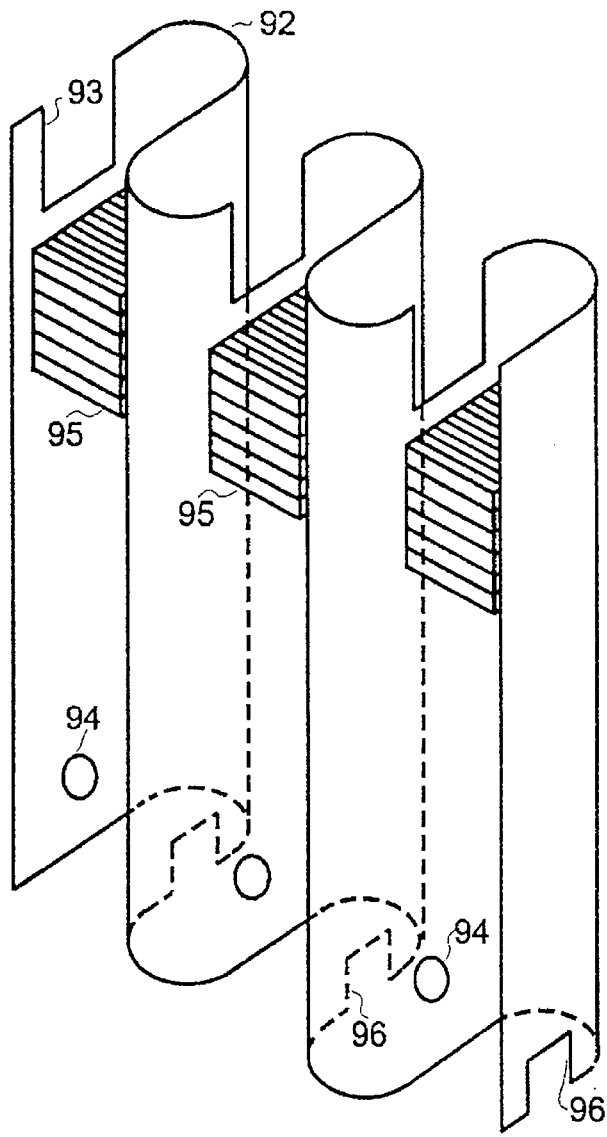

With the preceding disclosures of a horizontal array of sorption compartments arranged in the annular space between two vertical cylinders, and using approximately the same geometry for either absorption or desorption, it now becomes possible to mount an absorber annulus and desorber annulus concentrically, sharing a common wall which transfers heat between the two sorptions. The key advantage is that the two sorptions can be arranged in countercurrent heat exchange, thus overcoming the prior art "gravity mismatch." FIG. 15 illustrates one embodiment of such a "GAX" component. That figure is a segment of a cross-sectional plan view of a GAX component, comprised of outer cylinder 90 plus intermediate cylinder 91, which jointly delimit an absorption annulus which contains crested fin 92 (also illustrated in FIG. 16) which divides the annulus into a plurality of compartments. Cutouts 93 and 94 cause every other fin to function as a baffle separating a riser and downcomer. In the adjoining riser channels, a section of flow splitter 95 is mounted in the top section of each riser channel. This is an optional enhancement, which functions to maintain high transfer coefficients in that portion of the channel where flow has changed to bubbly flow vice slug or churn flow. One preferred type of flow splitter is lanced offset fin. Sorbent flow between compartments is via cutouts 96.

The desorber portion of the vertical cylindrical GAX component is between cylinder 91 and inner cylinder 97. Wall 91 is heated by absorption heat, and wall 97 is preferably heated by another heat source, e.g. exhaust gas from the primary flame. Enhanced surface 98 is used to better extract heat from the exhaust gas The desorption annulus is accordingly configured with risers at both walls, formed by the fins of rectangular fin 99, and downcomers between them, formed by the fins of rectangular fin 100. Note that any other suitable means of forming the interior downcomers could also be employed, e.g. the inserts of FIGS. 12, 13, and 14.

Figure 17:
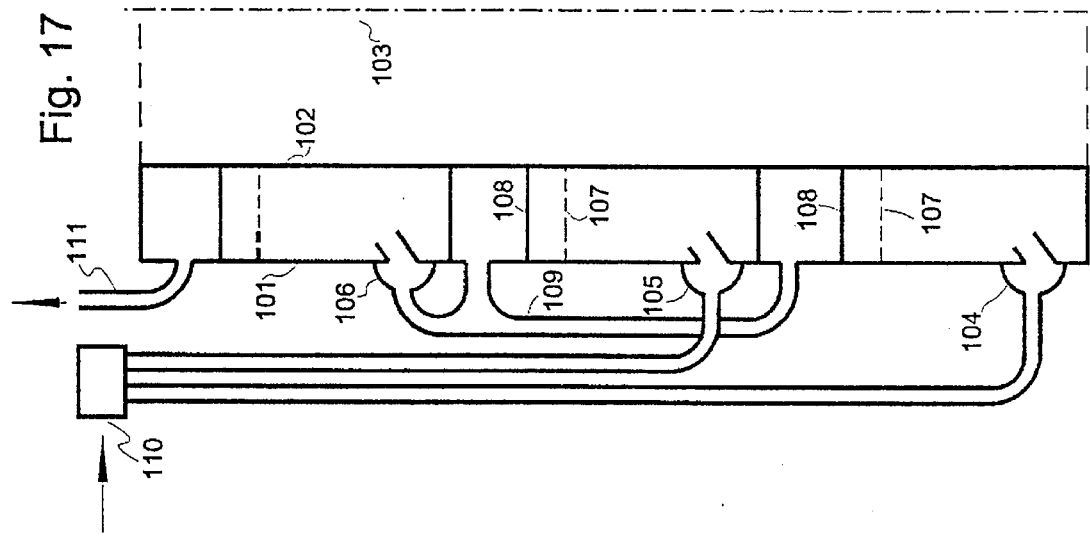

FIG. 17 illustrates a multipass arrangement of a locally cocurrent upflow absorber. The figure is one half of a front cutaway view of a vertical annular configuration, showing outer cylinder 101 inner cylinder 102, and cylinder axis 103. There are three tiers of annular absorption compartments, the first tier supplied vapor from injection manifold 104, the second tier from manifold 105, and the third tier from manifold 106. Partitions 108 delimit the compartments on each tier, and baffles 107 separate the downcomer and riser channels within each compartment. Incoming vapor is divided by divider 110 and supplied in parallel to manifolds 104 and 105. The vapor remaining after absorption in the bottom and middle tiers is collected in header 109 and supplied to manifold 106, thereby undergoing a second pass into the top tier. Any remaining unabsorbed vapor exits at port 111.

Figure 18:
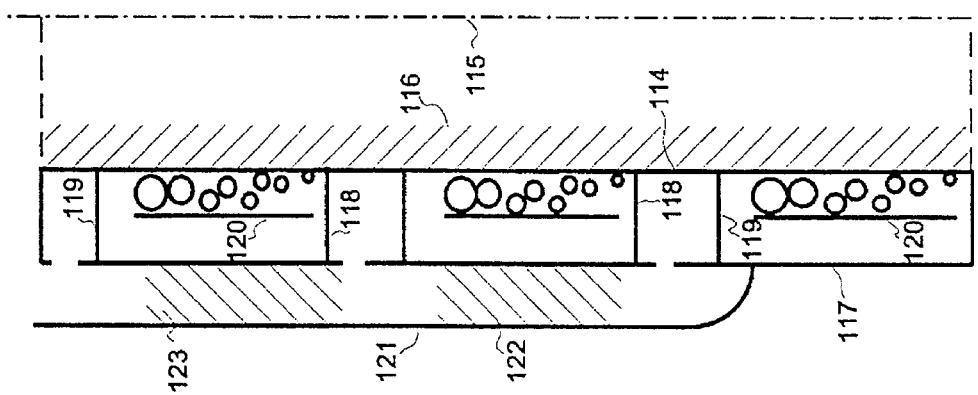

FIG. 18 illustrates a multi-tiered desorber, further adapted for post-treatment of desorbed vapor. Inner cylinder 114 with axis 115 is heated via enhanced heat transfer surface 116, causing desorption in three tiers of locally cocurrent upflow desorption compartments, contained by outer cylinder 117, and with the tiers separated by disc fins (flat washers) 118. Partitions 119 delimit the compartments, and baffles 120 separate downcomer and riser channels. Desorbed vapor is withdrawn into conduit 121, which incorporates vapor liquid contact media 122 in the flowpath of vapor from the bottom tier, and vapor liquid contact media 123 in the flowpath of the combined vapor from the middle tier and from contact media 122. The two contact media may be wetted with a small amount of feed sorbent.

Figure 19:
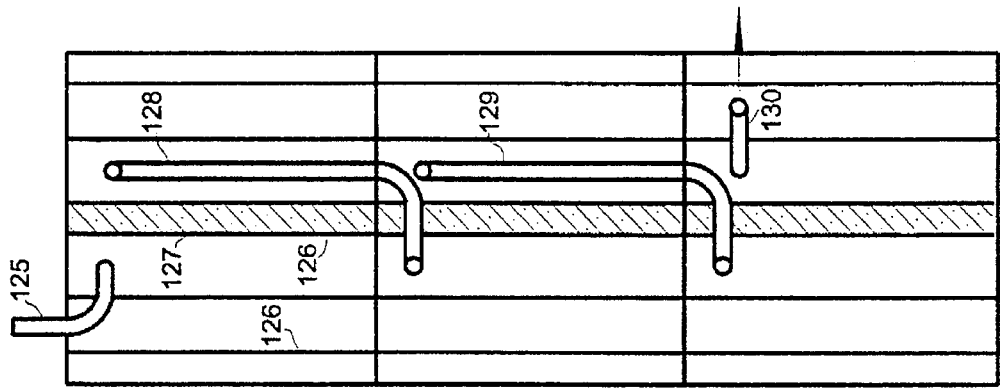

The flowpath of sorbent through either of FIG. 17 or FIG. 18 is illustrated by FIG. 19. Sorbent enters the top tier via port 125, traverses the several compartments 126 of that tier until it reaches the opposite side of blocking segment 127, then overflows through withdrawal pipe 128 down to the middle tier, where it accomplishes the same circuit and then overflows through pipe 129 to the bottom tier. Finally it is withdrawn through exit port 130.

Figure 20:
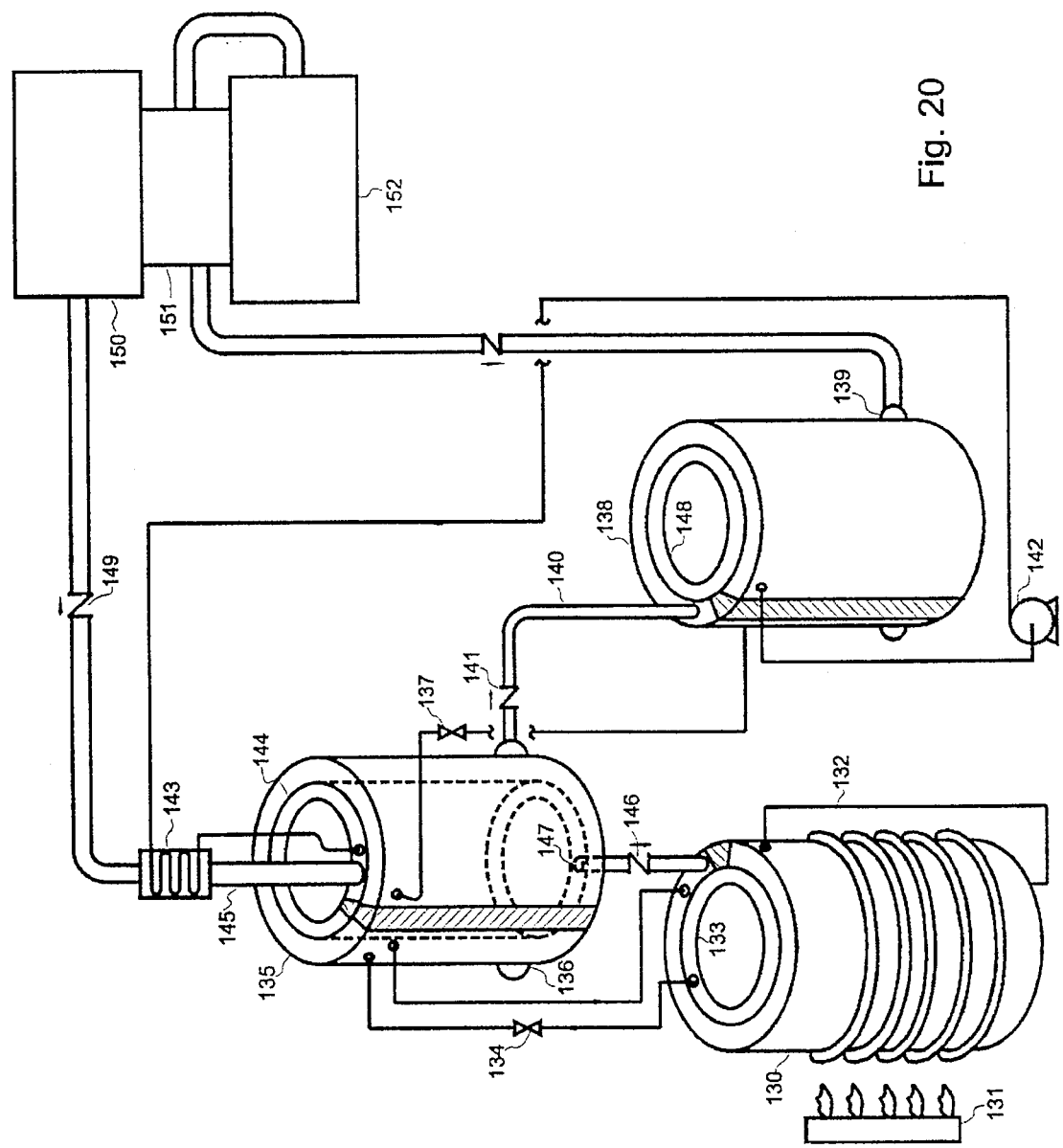

FIG. 20 presents an example of how the above described useful components—vertical annular configurations of horizontally arrayed, locally cocurrent upflow, pressure equalized sorbers (absorber, desorber, and GAX) can be configured into an overall useful process. FIG. 20 is a schematic flowsheet of a GAX absorption cycle apparatus, useful for space conditioning, refrigeration, and heat pumping. Direct fired desorber 130 is heated by flameholder 131. Strong sorbent, i.e. sorbent remaining after desorption, is withdrawn via conduit 132 and supplied to GHX 133, from whence it proceeds via pressure letdown 134 to the absorber section of GAX component 135. As it traverses the absorption annulus it absorbs vapor from manifold 136, then exits via means for level control 137 and is routed to absorber 138. As the sorbent traverses the absorption annulus of component 138, it partially absorbs vapor supplied via manifold 139, and the unabsorbed vapor is withdrawn via conduit 140 and check valve 141, and enters manifold 136, thus making a second pass (i.e. thereby being pretreated to a concentration which is closer to GAX absorption equilibrium). Fully absorbed sorbent ("weak" sorbent) is then routed to pump 142 which raises the pressure and circulates it via solution cooled rectifier (SCR) 143 to the desorption annulus 144 of GAX component 135. The sorbent traverses that annulus, and vapor is countercurrently withdrawn via conduit 145. The withdrawn vapor includes that desorbed as a result of the transfer of GAX absorption heat, plus preferably also the two pass vapor from desorber 130 via check valve 146 to injection manifold 147 (although it will be recognized that vapor stream could alternatively bypass the GAX component). After final rectification as desired, e.g. in SCR 143, the desorbed vapor flows through check valve 149 to condenser 150, then condensate through refrigerant heat exchanger 151 to evaporator 152, and finally low pressure refrigerant vapor back through RHX 151 to vapor supply manifold 139. The heat of absorption at absorber 138 is removed via cooling jacket 148. Note that the sorbent exiting pump 142 would preferably be routed also in heat exchange with absorber 138 before being sent to GAX desorber 144.

The disclosed invention is not limited to vertical annular configurations. FIGS. 21 through 24 illustrate plate fin configurations (brazed, welded, or other fin attachment methods) which accomplish the same result.

Figure 21:
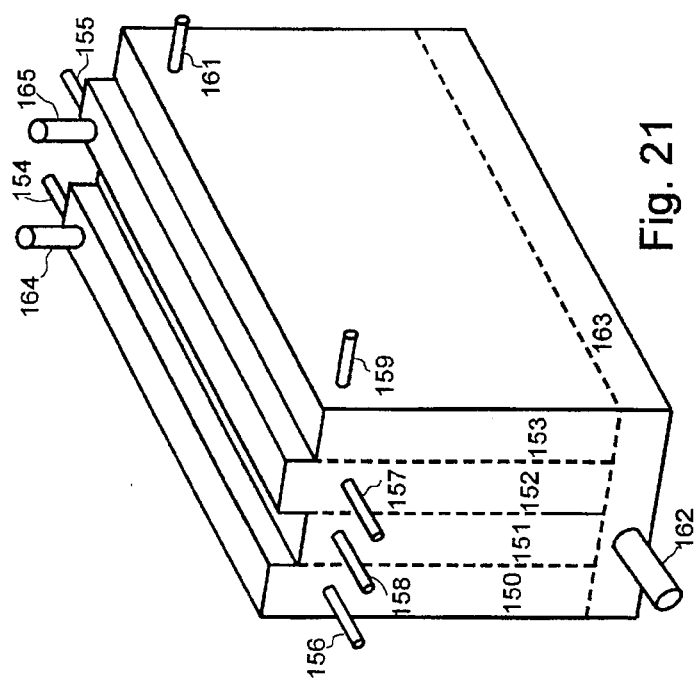

FIG. 21 is a perspective view of a brazed plate fin locally cocurrent upflow latent-to-latent heat exchanger, e.g. either an absorber-desorber (GAX component) or a rectifier-stripper (distillation component) or a scrubber-regenerator. In other words, the vapor liquid contact occurring in sections 150 and 152 is endothermic, and that in sections 151 and 153 is exothermic, and there is heat transfer between the respective sections. Pursuing the particulars as applied to a GAX component, sorbent from an absorber and pump is supplied to compartments 150 and 152 via conduits 154 and 155, and after partial desorption in a plurality of sequential desorption compartments is withdrawn at ports 156 and 157. Desorbed sorbent from the externally heated desorber is supplied to compartments 151 and 153 via supply ports 158 and 159 respectively, and is withdrawn via ports 160 (not shown) and 161 after traversing a sequential plurality of absorption compartments. The vapor being absorbed is supplied via port 162 and manifold 163. Heat of absorption is transferred to the desorbing compartments, and desorbed vapor is withdrawn from those compartments countercurrently to the direction in which sorbent is routed through them, the vapor exiting at ports 164 and 165.

Figure 22:
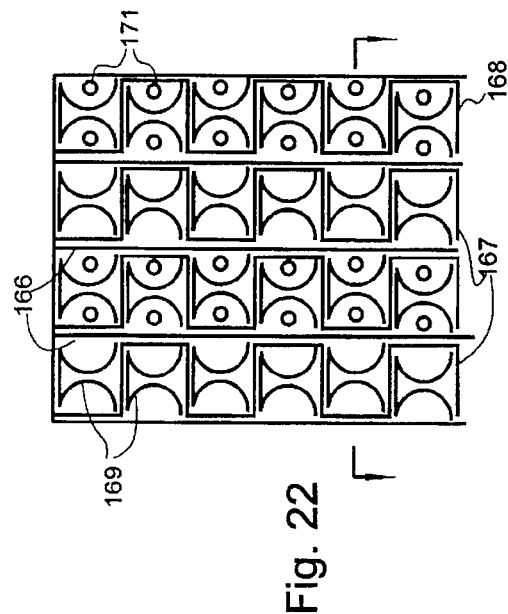
Figure 23:
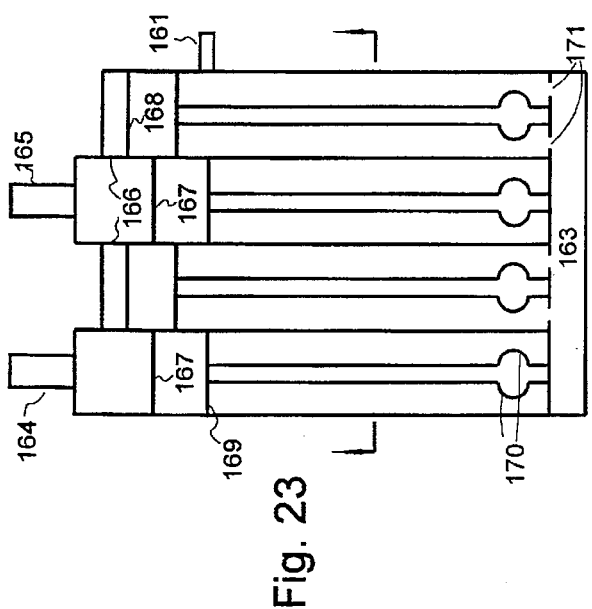

FIGS. 22 and 23 show internal details of the FIG. 21 apparatus and are respectively a cutaway top view and cutaway front view. Flat plates 166 form pressure boundaries between absorbing sections 151, 153 and desorbing sections 150, 152. Rectangular fin 167 forms the individual desorbing compartment boundaries or partitions, in addition to lending strength to the overall apparatus as a result of being bonded to plates 166. The bonding also promotes heat and mass transfer. Rectangular fin 168 correspondingly delineates the absorbing compartment boundaries.

Figure 24:
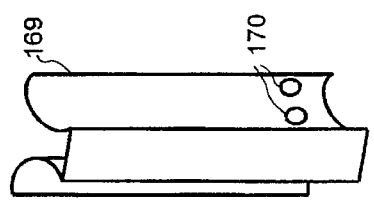
Figure 28:
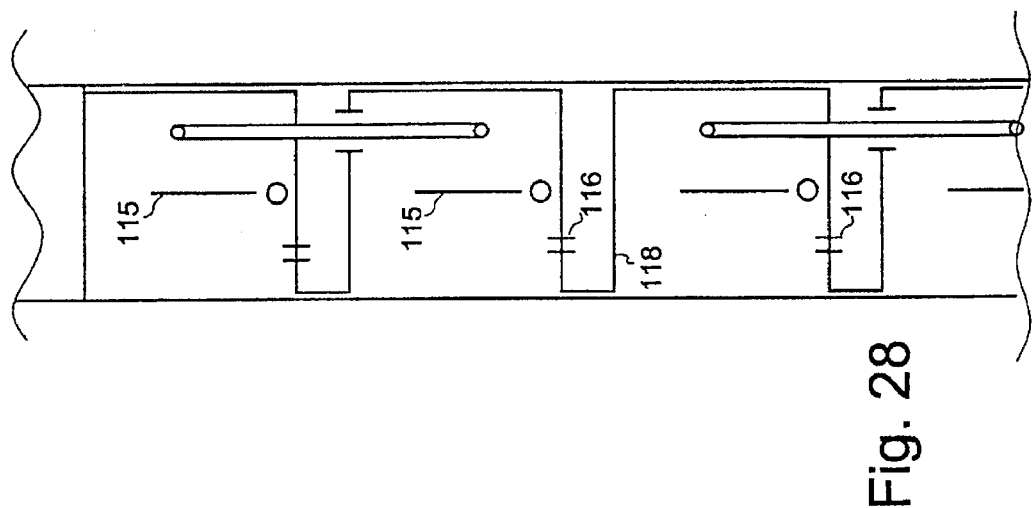

Since the interior sections of absorption and desorption are heat exchanged at both side walls, it is desirable to have risers on each side of those compartments, with the downcomer in the middle. This is readily accomplished via inserts 169 which are inserted into each compartment. FIG. 24 provides additional detail of inserts 169. They have holes 170 at the bottom to allow liquid communication from the downcomer channel to the two riser channels. Inserts 171 have a rounded shape which promotes good slug flow transfer characteristics in the riser channels, and which also provides some spring action to hold it firmly in the compartment (e.g. until brazing). The top of the inserts are lower than the tops of rectangular fins 167 and 168, thereby delineating the vapor-liquid separation zone. Vapor injection ports 171 supply vapor from manifold 163 into each absorption riser channel. It will be recognized that either the absorber sections of FIGS. 21–23 or the desorber sections can be applied in other configurations—stand-alone (adiabatic) or diabatic with sensible heat exchange fluids vice the depicted latent-to-latent heat exchange.

In general, all of the folded fin configurations which can be fashioned into compartments with riser and downcomer channels in the vertical annular cylindrical configuration can also be used in the plate fin configuration, and vice versa. As an example of that, FIGS. 25 (cutaway elevation cross-section) and 26 (cutaway plan view) illustrate a plate fin absorber-desorber heat exchange (GAX) configuration wherein the desorber uses the same configuration of three adjacent rows of rectangular fin as in FIG. 15 to form the compartments and channels, and the absorber uses a similar arrangement. Plate members 100 form the pressure boundaries between absorption zones and desorption zones, and intermediary partial plates 101, in conjunction with folded rectangular fin, form the channel boundaries. Folded fin segments 102 form the absorber risers; segment 103 form the absorber downcomers; segments 104 the desorber risers; and segments 150 the desorber downcomers. Each absorber riser channel has an associated vapor injection port 106. In the brazed plate fin configuration the pressure boundary plates 100 usually rely on the additional strength imparted by the brazed fin members, hence it is preferred to extend the vertical fin into the vapor space and use holes 107 to accomplish pressure equalization, as shown in the absorber sections; or to incorporate a separate horizontally oriented perforated fin 108, as shown in the desorber sections. The latter permits higher vapor flow rates above the desorption zones. Similar fin material may also be incorporated in vapor manifold 109 for strengthening it. It will be evident that the plate fin absorbers can alternatively or additionally be cooled by a sensible heat cooling medium, and similarly that the plate fin desorbers can alternatively or additionally be heated by a sensible heat heating medium, for example combustion gas.

Figure 27:
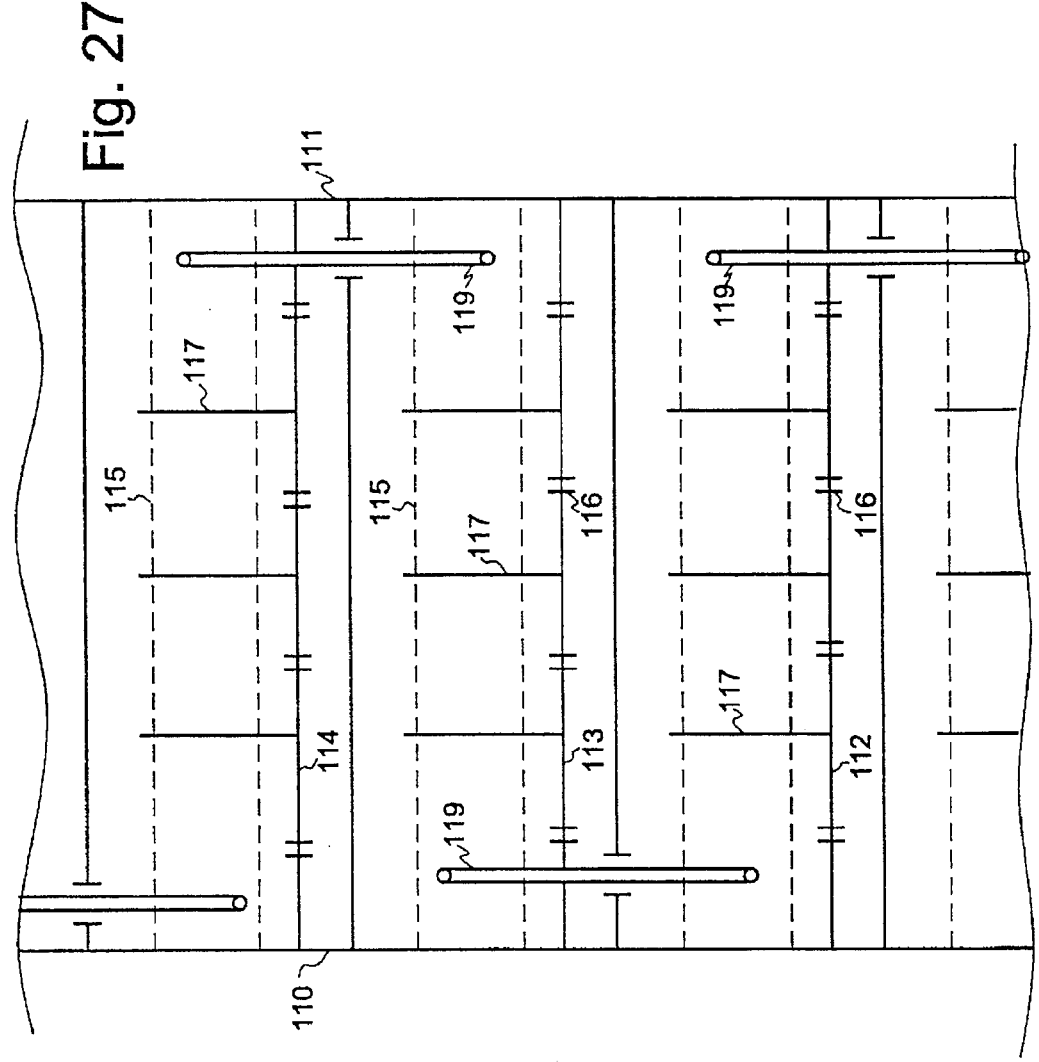

The plate fin configuration can also incorporate tiering and multipassing, as illustrated by FIGS. 27 (front cutaway) and 28 (side cutaway). Pressure boundaries 110 and 111 enclose a vertical stack of absorption tiers, each respectively fed vapor crosscurrently by vapor injection manifold 112, 113, and 114. Each tier is comprised of channel baffles 115, and vapor injection ports 116. Compartments are delineated by horizontal runs of folded rectangular fin with vertically oriented fins, 117. the tiers are delineated by rectangular folded fin member 118, which also delineates the vapor manifolds supplying the injection ports 116. Liquid sorbent advances from tier to tier through overflow pipes 119.

Figure 30:
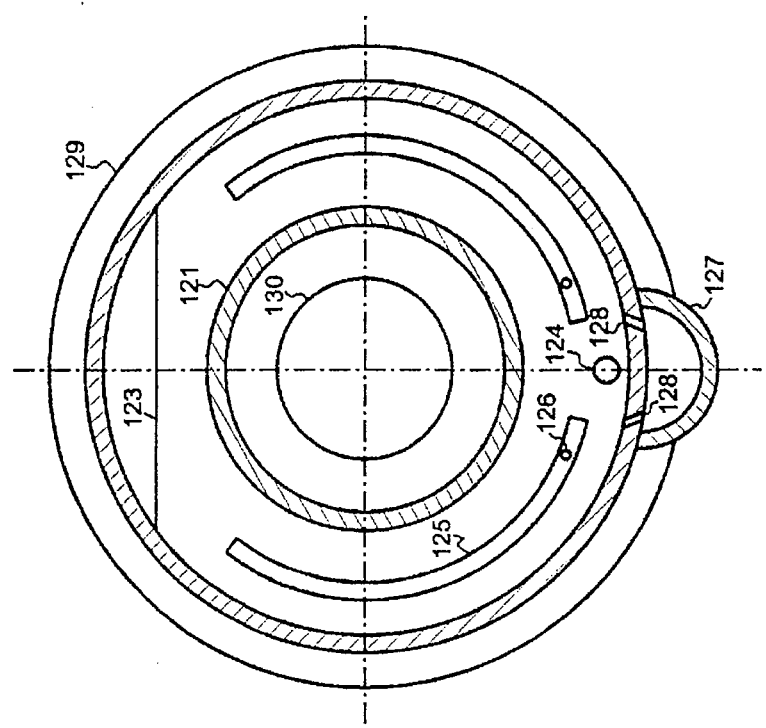
FIGS. 29 through 37 illustrate modes of realization of the disclosed invention in horizontal annular cylindrical geometry.
Figure 29:
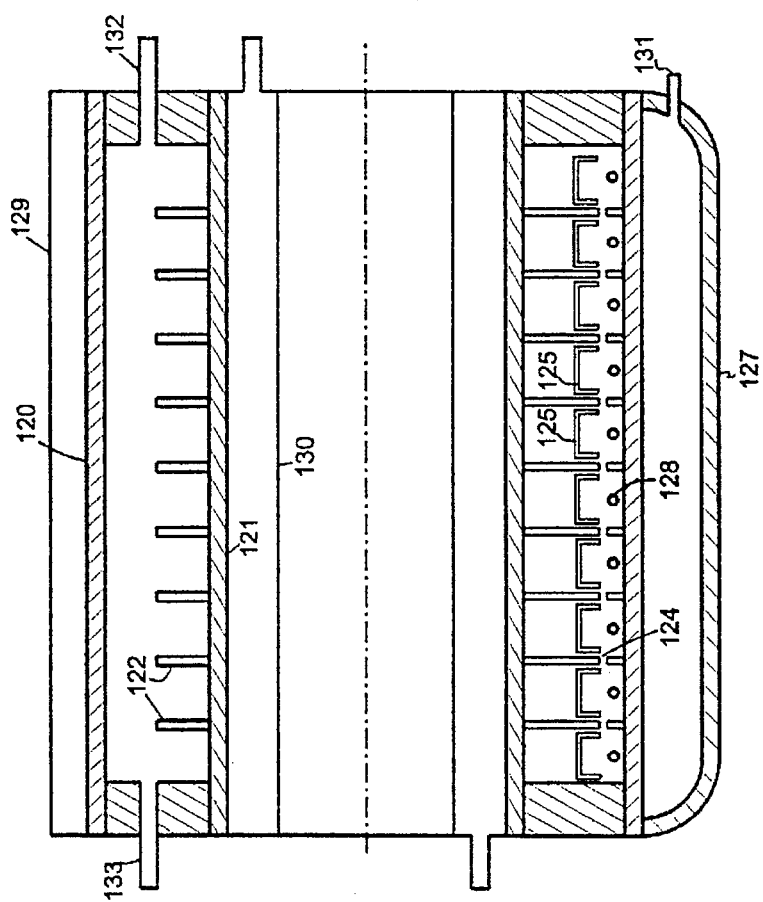
Figure 31D:
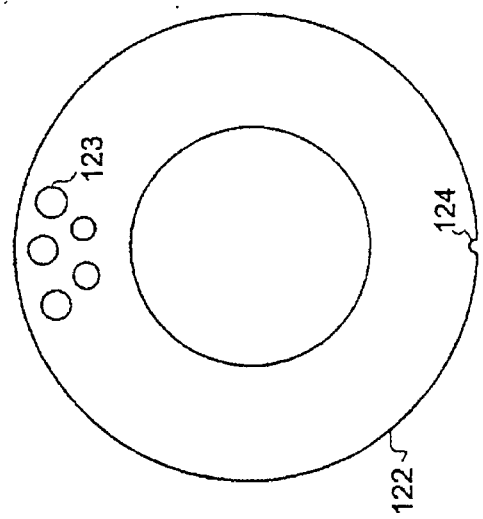
Figure 31C:
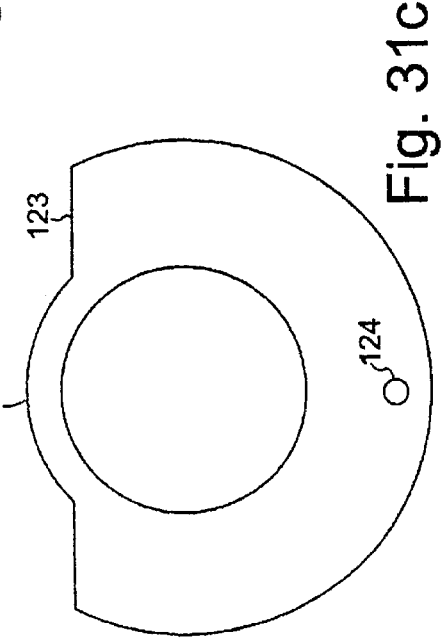
Figure 31B:
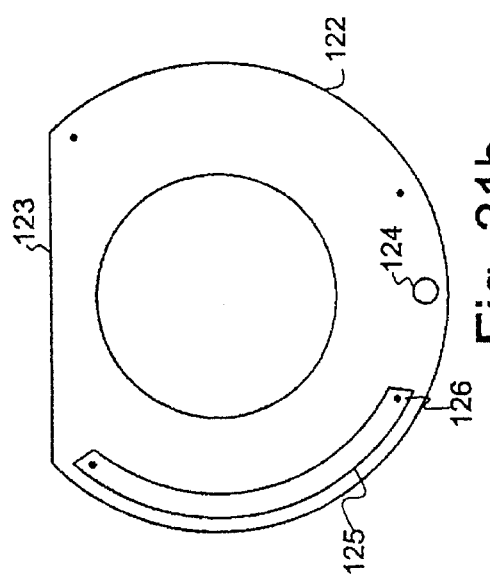
Figure 31A:
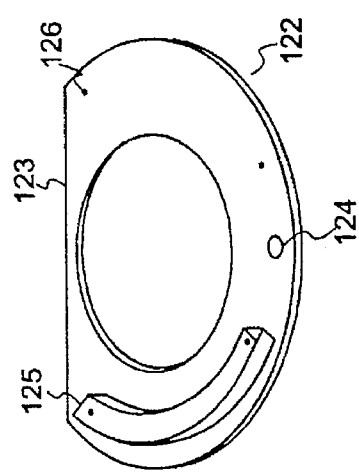

The horizontal array of locally cocurrent upflow pressure equalized compartments can be implemented in horizontal cylindrical annular configurations, in addition to the vertical cylindrical annular configurations and the plate fin configurations described above. FIGS. 29 through 37 are directed to that arrangement FIGS. 29 and 30 are front and side cutaway views of adiabatic absorber which has multiple horizontally arrayed locally cocurrent upflow absorption compartments which are pressure equalized. Outer horizontal cylinder 120 and concentric inner cylinder 121 jointly form an annular space which is divided into a plurality of compartments by disc fins 122. The fins are preferably in thermal contact with both cylinder walls, e.g. by press fit, heat shrinking, brazing, welding, or the like. Each fin has a cutaway or vapor opening 123 at the top, and a liquid passage 124 preferably near the bottom. The fins are spaced by curved baffles or shrouds 125, which also divide each side of each compartment into an inner and outer channel. The baffles may be in the form of bent U channels, and may be affixed to the fins by pins or rods 126. FIG. 31 provides additional details on possible fin and baffle configurations. Exterior vapor manifold 127, welded to the outer cylinder, supplies vapor to a pair of vapor injection ports 128 for each compartment. Vapor and liquid flow upward cocurrently outside baffle 125, any remaining vapor separates from the liquid above baffle 125, and the liquid recirculates to the bottom of the compartment inside baffle 125.

Similar to the vertical cylindrical annular configurations, the horizontal annular configurations also have the advantage that there can be concentric heat exchange jackets both outside the outer cylinder and inside the inner cylinder. They may both contain the same heat transfer fluid, or each be different. Dependent on the desired temperature rise of the heat transfer fluid, it may be flowed cocurrently with the flow direction of liquid sorbent, or countercurrently to it.

In FIGS. 29 and 30, cooling is supplied both via outer jacket 129 and inner jacket 130. Vapor is supplied at inlet 131, and sorbent is supplied and withdrawn at ports 132 and 133.

Figure 33:
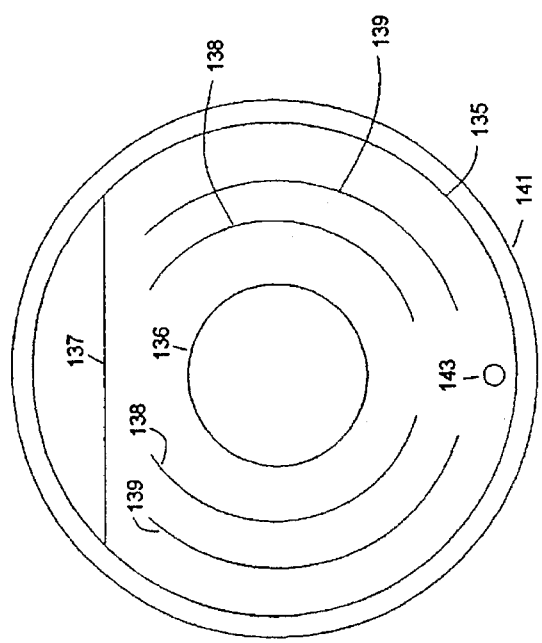
Figure 32:
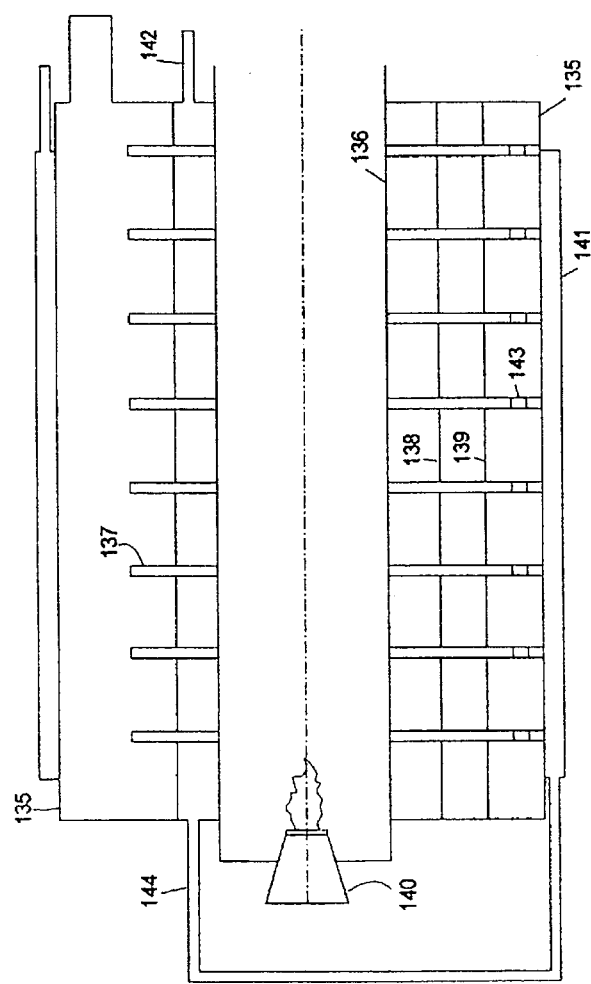

FIGS. 32 and 33 are respectively front and side cutaway views of a horizontal cylindrical annular configuration of desorber. Concentric outer cylinder 135 and inner cylinder 136 have annular disc fins 137 which divide the annular space into compartments. Inner baffles 138 and outer baffles 139 divide each side of each compartment into three concentric channels. The inner wall 136 of the inner channels in heated by flameholder 140, and hence is a desorption riser channel. The outer wall 135 is heated by fluid in heating jacket 141 (e.g. GHX), and hence the outer channel is also a desorption riser channel. The middle channel is thus a downcomer for both risers. Sorbent enters at port 142, sequences through openings 143 in each disc fin 137, and exits at port 144.

Figure 34:
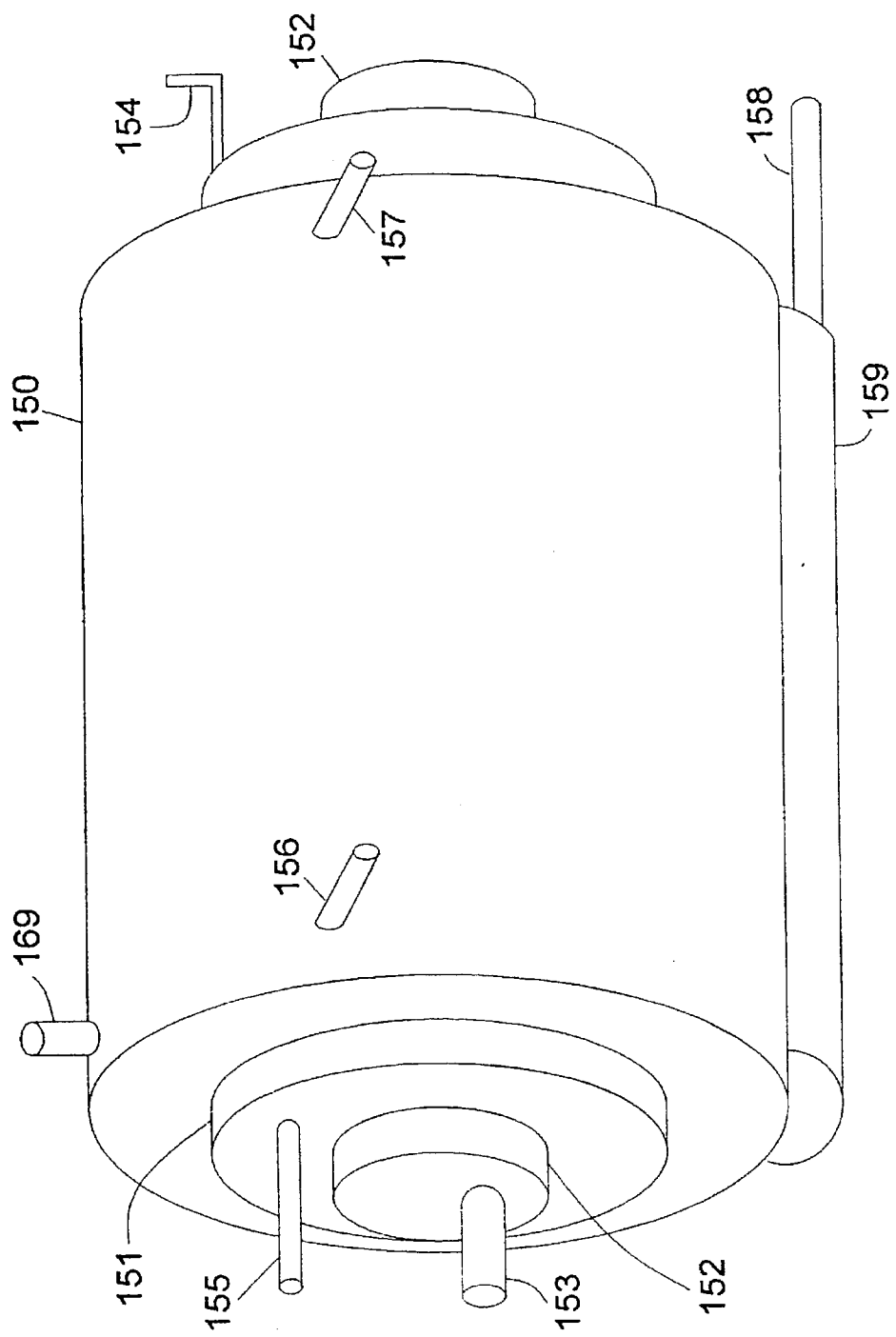
Figure 36:
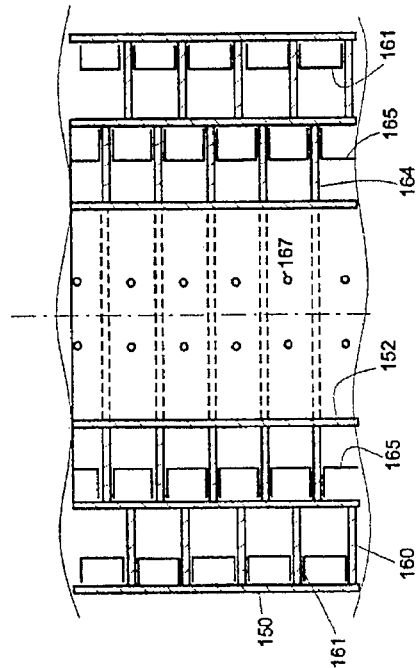
Figure 37:
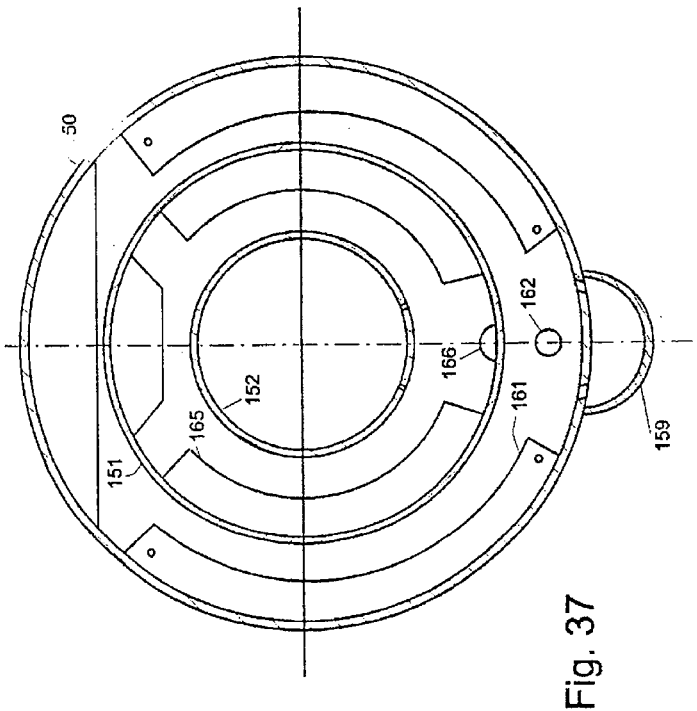
Figure 35:
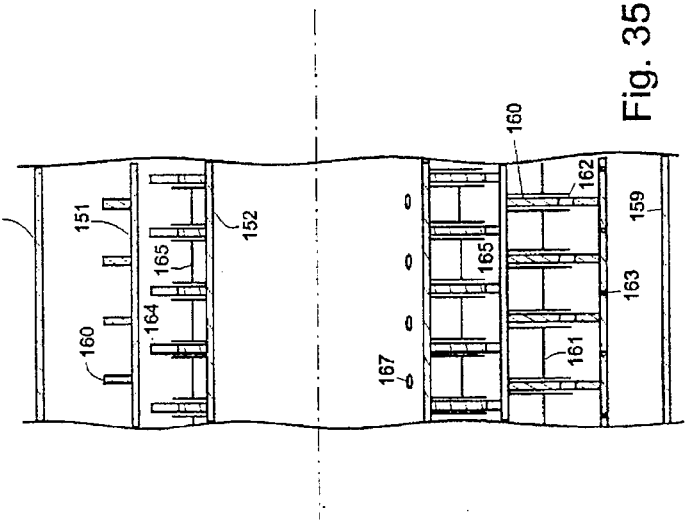

As with the other geometries, the horizontal annular cylindrical configuration can also readily combine an absorber and a desorber in countercurrent heat exchange relationship, i.e. a GAX component. FIGS. 34 through 37 illustrate that. FIG. 34 is a perspective view, FIG. 35 a front cutaway, FIG. 36 a top cutaway, and FIG. 37, a side cutaway view of a globally non-cocurrent mass exchange desorber and globally crosscurrent mass exchange absorber in countercurrent heat exchange relationship. Referring to FIG. 34, outer cylinder 150 and intermediate cylinder 151 jointly define the desorption annular space, while cylinder 151 and inner cylinder 152 define the absorption annulus. The interior of inner cylinder 152 functions as the absorption vapor supply manifold, supplied via inlet port 153. Hot depressurized strong sorbent is supplied to the absorption annulus at sorbent inlet port 154, and is withdrawn after absorption at exit port 155. Weak cold pressurized sorbent is partially heated in an AHX and/or SCR and then fed via feed port 156 to the colder end of the desorption annulus, then progresses sequentially to the warmer end, where it is withdrawn at withdrawal port 157. From there is it normally routed to the externally heated desorber, and vapor from that desorber is preferably returned to the desorption annulus of the GAX component via conduit 158 and vapor manifold 159. FIGS. 35, 36, and 37 provide details of the interior construction of FIG. 34. Disc fins 160 form the compartments in the desorption annulus; baffles 161 provide riser and downcomer channels in each compartment to allow cocurrent upflow and liquid recirculation; liquid ports 162 permit sequential flow of liquid through the compartments; and vapor injection ports 163 allow a multipass of the vapor from the externally heated debsorber. Similarly, in the absorption annulus fins 164 form the compartments; baffles 165 separate the riser and downcomer channels; flow passages 166 allow sequential flow of sorbent through the compartments; and vapor injection ports 167 feed vapor to be absorbed into the riser channels of each compartment.

Desorbed vapor is withdrawn from the GAX component at exit port 169, at the low temperature end. Whereas the embodiment illustrated in FIGS. 34 through 37 has the absorber inside the desorber, it will be recognized that that geometry could be inverted, in which case exhaust gas could be routed through the inner cylinder, recouping more heat. Similarly in the configuration illustrated exhaust gas can be routed through a jacket surrounding the outer cylinder. For either of these cases the desorber compartments should have dual riser channels as illustrated in FIGS. 32 and 33.

It will be recognized that the various geometries of absorber, desorber, and GAX component illustrated above can be mixed and matched, for example a horizontal desorber could be combined with a vertical cylindrical GAX and a plate fin absorber to comprise a GAX cycle apparatus. The same is true when the various components are applied as strippers, rectifiers, stripper-rectifiers, or other vapor-liquid contact devices The disclosed contact devices can also be employed as reactive distillation apparatus. In that event, the "flow splitter" present in riser channels (e.g. FIGS. 15 and 16) would be catalytically active for the desired reaction.

In FIG. 20 the check valve 141 and level control valve 137 function to convert the GAX to a liquid heat exchanger when GAX overlap is lost. That technique applies generally to all GAX cycles, and is not limited to the locally cocurrent configurations disclosed here.

Another example of a horizontal annular cylindrical desorber having multiple cocurrent upflow liquid recirculating compartments is found in copending application Ser. No. 473,309 filed Jun. 7, 1995 by Donald C. Erickson, which is incorporated by reference.

I claim:
1. Adiabatic vapor-liquid sorber comprised of:
 a) a plurality of pressure equalized compartments, each compartment adapted for upflow of vapor and liquid in a portion thereof;
 b) a sequential flowpath for liquid through said compartments; and
 c) a means for exchanging heat with said compartments.
2. The sorber of claim 1 adapted for desorbing said vapor from said liquid, wherein said means for exchanging heat provides heat to said compartments, and additionally comprised of a sequential flowpath for removal of vapor from said compartments which is in countercurrent sequence to said liquid flowpath.
3. The sorber of claim 1 adapted for absorbing said vapor into said liquid, wherein said means for exchanging heat removes heat from said compartments, and additionally comprised of a vapor injection port in the bottom portion of each compartment.
4. The sorber of claim 1 additionally comprised of a liquid downcomer in communication with each compartment.
5. The sorber of claim 4 wherein said liquid downcomer is in fluid communication with said upflow portion of said compartment at both the top and bottom ends, whereby liquid recirculation within the compartment is enabled.
6. The desorber according to claim 2 wherein said means for providing heat is an absorber according to claim 3.
7. The combination absorber-desorber of claim 6 wherein the liquid flowpath through the absorber compartments is countercurrent to the flowpath of liquid through the desorber compartments which are in heat exchange relationship with the respective absorber compartments, whereby countercurrent heat exchange is enabled.
8. The sorber of claim 4 comprised of inner horizontally oriented and outer cylinders, plus a plurality of annular heat transfer fins which form said compartments, plus shrouds between adjacent fins which divide each compartment into upflow and downflow channels, plus cutouts or openings in the top portion of each fin which provide pressure equalization.
9. The sorber of claim 4 comprised of flat plate members which form pressure boundaries for said means for heat exchange, plus folded rectangular fin plate members which separate said compartments and form said downcomers.
10. The sorber of claim 1 wherein said means for exchanging heat is comprised of two hermetically separate fluids.
11. A vapor-liquid sorber comprised of:
 a) a plurality of compartments, each compartment comprised of at least one vapor-liquid upflow channel and at least one liquid downflow channel, said channels adapted for liquid recirculation within said compartment; and
 b) a sequential liquid flowpath through said compartments, including a liquid supply port in one compartment and a liquid withdrawal port in another.
12. The sorber in accordance with claim 11 additionally comprised of a pressure equalization connection in the top portion of each compartment.
13. The sorber in accordance with claim 11 additionally comprised of a containment for heat transfer fluid which is in heat exchange contact with said compartments.
14. The sorber of claim 11 adapted for desorbing said vapor from said liquid, and additionally comprised of a sequential flowpath for removal of vapor from said compartments which is in countercurrent sequence to said liquid flowpath.

15. The sorber of claim 11 adapted for absorbing said vapor into said liquid, and additionally comprised of a vapor injection port in the bottom portion of each compartment.

16. The absorber of claim 15 additionally comprised of a manifold for supplying said vapor to said injection ports, plus a means for supplying a minor amount of a liquid to said manifold in order to adjust the concentration of the vapor therein.

17. The absorber of claim 16 wherein said minor amount of liquid flows countercurrently to said vapor in said manifold.

18. The absorber of claim 13 used as a latent heat exchange component in an absorption cycle apparatus.

19. An absorption cycle apparatus for at least one of cooling, refrigeration, and heat pumping comprised of at least one diabatic sorber which is comprised of a plurality of pressure equalized compartments, each compartment comprised of a cocurrent vapor-liquid upflow portion, a liquid downflow portion, and a vapor injection port for each upflow portion.

20. The apparatus according to claim 19 wherein said sorber is a desorber, and additionally comprised of an absorber which is comprised of a plurality of pressure equalized compartments, each compartment comprised of a cocurrent vapor-liquid upflow portion and a liquid downflow portion.

21. The apparatus according to claim 20 wherein said absorber and said desorber are in countercurrent heat exchange relationship.

22. A process for exchanging heat with a multi-component mass exchanging fluid comprising:

a) exchanging heat with a plurality of compartments;

b) upflowing multi-component vapor and liquid in at least one channel within each compartment;

c) downflowing multi-component liquid in another channel within each compartment;

d) joining said channels in fluid communication at their top portions and in liquid communication at their bottom portions; and e) sequentially routing multi-component liquid through at least three of said compartments.

23. A vapor-liquid contact apparatus comprised of:

a) a plurality of horizontally arrayed compartments;

b) a common vapor space connecting said compartments;

c) a baffle within each compartment which forms separate vapor-liquid cocurrent upflow channel and liquid downflow channel;

d) a means for sequential flow of liquid through said compartments; and e) a vapor-liquid separation zone above each baffle.

24. The apparatus according to claim 23 additionally comprised of a means for flow splitting in said upflow channels.

* * * * *